United States Patent [19]
Carroll et al.

[11] Patent Number: 5,293,310
[45] Date of Patent: Mar. 8, 1994

[54] FLEXIBLE METHOD FOR APPLYING CUSTOMIZED RATING ADJUSTMENTS TO TRANSACTION CHARGES

[75] Inventors: Terri A. Carroll, Milford; Jacques E. Hasbani, Bethel, both of Conn.

[73] Assignee: Pitney Bowes Inc., Stamford, Conn.

[21] Appl. No.: 888,682

[22] Filed: May 22, 1992

[51] Int. Cl.⁵ .................................. G06F 15/20
[52] U.S. Cl. .......................... 364/408; 364/464.02
[58] Field of Search ............... 364/464.01, 464.02, 364/464.03, 401, 408, 466

[56] References Cited

U.S. PATENT DOCUMENTS

| | | | |
|---|---|---|---|
| 4,138,735 | 2/1979 | Allocca et al. | 364/464.02 |
| 4,286,325 | 8/1981 | Dlugos et al. | 364/464.03 |
| 4,320,461 | 3/1982 | Dlugos et al. | 364/464.02 |
| 4,499,545 | 2/1985 | Daniels et al. | 364/464.02 |
| 4,504,915 | 3/1985 | Daniels et al. | 364/464.02 |
| 4,535,419 | 8/1985 | Dlugos et al. | 364/464.03 |
| 4,713,761 | 12/1987 | Sharpe et al. | 364/406 |
| 4,726,056 | 2/1988 | An et al. | 379/115 |
| 4,908,852 | 3/1990 | Hird et al. | 379/130 |
| 4,916,624 | 3/1990 | Collins et al. | 364/470 |
| 4,916,634 | 4/1990 | Collins et al. | 364/470 |
| 4,926,344 | 5/1990 | Collins et al. | 364/470 |
| 4,949,272 | 8/1990 | Vanoureke et al. | 364/464.02 |
| 5,003,584 | 3/1991 | Benyacar et al. | 379/119 |
| 5,070,463 | 12/1991 | Schurichtv et al. | 364/464.02 |
| 5,072,397 | 12/1991 | Barns-Slavin et al. | 364/464.02 |

OTHER PUBLICATIONS

TanData Product News; Apr. 6, 1990; Parcel Manifest System PMS 3000 TM.

Primary Examiner—Robert A. Weinhardt
Assistant Examiner—Ari M. Bai
Attorney, Agent, or Firm—Robert H. Whisker; Melvin J. Scolnick

[57] ABSTRACT

The present invention relates to a method and a system for enabling an authorized user of the system to automatically apply customized rating adjustments to transaction charges. To this end, a structure is employed for supplying to a central processor information identifying criteria for rating and for customized rating adjustments. The central processor compares data entered through an input device with information stored in memory. The central processor, after correlating the identifying information with the entered input data, generates a base rate and a modified rate (which incorporates a customized rating adjustment) for a particular transaction and user. The calculated charges are made available for output to the user.

16 Claims, 24 Drawing Sheets

OVERALL SYSTEM

FIG. 2

DISCOUNT/SURCHARGE ORDER FORM

ACCOUNT REPRESENTATIVE
NAME: _____
DISCOUNT AUTHORIZATION CODE: _____
DATE: _____

CUSTOMER INFORMATION
NAME: _____
ADDRESS: _____

| SERVICE: | | SERVICE: | | SPECIAL SERVICE: | |
|---|---|---|---|---|---|
| DISCOUNTS | | DISCOUNTS | | DISCOUNTS | |
| 24.2 CELL KEY | 26.2 VALUE KEY | 24.2 CELL KEY | 26.2 VALUE KEY | 24.2 CELL KEY | 26.2 VALUE KEY |
| | | | | | |
| SURCHARGES | | SURCHARGES | | SURCHARGES | |
| 24.2 CELL KEY | 26.2 VALUE KEY | 24.2 CELL KEY | 26.2 VALUE KEY | 24.2 CELL KEY | 26.2 VALUE KEY |
| | | | | | |

FIG. 2A — 20.1

DISCOUNT STATISTICAL REPORT
THE CARRIER NAME
JAN 1, 1992 - APR 1, 1992

| SERVICE NAME | DISCOUNT CRITERIA | | | DISCOUNT TYPE MEAN VALUE | |
|---|---|---|---|---|---|
| NEXT DAY | ZONE | WEIGHT RANGE | | % WITH CEILING | FLAT $ RATE |
| | ALL | ALL | | 9%  $0.60 | $0.50 |
| | | 0- 5 | | 15% $0.40 | $1.00 |
| | | 6- 10 | | 5%  $0.00 | $0.45 |
| | | 11- 20 | | 3%  $0.55 | $1.00 |
| | | 21- 40 | | 10% $0.00 | $1.20 |
| | | 41- 60 | | 7%  $0.99 | $0.70 |
| | | 61- 70 | | 12% $1.10 | $0.40 |
| | | 71-100 | | 4%  $0.00 | $0.80 |
| | | 101-200 | | 6%  $0.50 | $0.90 |
| | | 201-500 | | 9%  $0.70 | $0.70 |
| | | 501-999 | | 4%  $1.00 | $0.40 |
| | 2 | ALL | | 12% $0.70 | $0.80 |
| | | 0- 5 | | 10% $0.00 | $0.40 |
| | | 6- 10 | | 11% $0.50 | $0.40 |
| | | 11- 20 | | 9%  $0.80 | $0.70 |
| | | 21- 40 | | 9%  $0.80 | $1.00 |
| | | 41- 60 | | 14% $1.00 | $1.00 |
| | | 61- 70 | | 13% $1.00 | $0.90 |
| | | 71-100 | | 12% $0.90 | $0.70 |
| | | 101-200 | | 13% $1.00 | $1.10 |
| | | 201-500 | | 9%  $1.00 | $0.75 |
| | | 501-999 | | 15% $1.50 | $1.30 |
| | ⋮ | | | | |
| | ZONE | WEIGHT RANGE | NUMBER PIECES | % WITH CEILING | FLAT $ RATE |
| | ALL | ALL | 1 | 5%  $0.30 | $0.10 |
| | | | 2-20 | 7%  $0.40 | $0.40 |
| | | | 21-50 | 8%  $0.40 | $0.80 |
| | | | 51-100 | 10% $0.00 | $1.00 |
| | | | 101-200 | 10% $1.20 | $1.10 |
| | | | 201-999 | 15% $2.00 | $1.50 |
| | | 1-35 | 1-20 | 5%  $0.60 | $0.70 |
| | | | 21-50 | 11% $0.80 | $0.80 |
| | | | 51-100 | 10% $0.80 | $0.80 |
| | | | 101-200 | 9%  $1.00 | $1.00 |
| | | | 201-999 | 8%  $1.00 | $1.10 |
| | | 36-70 | 1-20 | 8%  $0.90 | $1.00 |
| | | | 21-50 | 10% $1.00 | $1.30 |
| | | | 51-100 | 10% $1.10 | $1.50 |
| | | | 101-200 | 12% $1.20 | $1.70 |
| | | | 201-999 | 15% $1.50 | $2.00 |
| | 2 | ALL | 1 | 3%  $0.45 | $0.80 |
| | | | 2-20 | 6%  $0.60 | $1.00 |

FIG. 2B 22.1

| | THE SHIPPER'S NAME<br>RATING ADDRESS STREET<br>RATING ADDRESS STREE TOO<br>RATING CITY, CA 90005 | | THE CARRIER'S NAME<br>SHIPPING CHARGES<br>PERIOD ZONE SUMMARY | | SHIPPER NO:<br>START DATE:<br>END DATE: | CT 123-456<br>12/31/91<br>01/31/92 |
|---|---|---|---|---|---|---|

| | ZONE | PIECES | LBS | DEL CHGS | AVE WT |
|---|---|---|---|---|---|
| GROUND | | | | | |
| | 2 | 15 | 410 | 55.32 | 28 |
| | 3 | 13 | 438 | 69.84 | 34 |
| | 4 | 7 | 242 | 45.93 | 35 |
| | 5 | 6 | 76 | 26.99 | 13 |
| | 6 | 8 | 247 | 51.76 | 31 |
| | 7 | 10 | 398 | 144.91 | 40 |
| | 8 | 10 | 516 | 209.99 | 52 |
| | 51 | 1 | 10 | 17.40 | 10 |
| | 52 | 0 | 0 | 0 | 0 |
| | 53 | 1 | 16 | 14.70 | 16 |
| | 54 | 0 | 0 | 0 | 0 |
| AIR | | | | | |
| | 12 | 0 | 0 | 0 | 0 |
| | 14 | 5 | 108 | 141.50 | 22 |
| | 15 | 1 | 16 | 21.00 | 16 |
| | 16 | 1 | 46 | 60.00 | 46 |
| | 22 | 2 | 46 | 71.50 | 23 |
| | 24 | 4 | 54 | 117.50 | 14 |
| | 25 | 12 | 147 | 369.25 | 13 |
| | 87 | 3 | 61 | 162.00 | 21 |
| | 88 | 0 | 0 | 0 | 0 |
| | 89 | 3 | 51 | 191.00 | 17 |
| | 921 | 0 | 0 | 0 | 0 |
| | 922 | 0 | 0 | 0 | 0 |
| | 923 | 0 | 0 | 0 | 0 |
| | 924 | 0 | 0 | 0 | 0 |
| | 925 | 0 | 0 | 0 | 0 |
| | 926 | 0 | 0 | 0 | 0 |
| | 927 | 0 | 0 | 0 | 0 |
| | 928 | 0 | 0 | 0 | 0 |
| | 929 | 0 | 0 | 0 | 0 |
| | 930 | 0 | 0 | 0 | 0 |
| | 931 | 0 | 0 | 0 | 0 |
| | 932 | 0 | 0 | 0 | 0 |
| PIECE COUNT | | XXX | XXX | XXXX.XX | XXX |

FIG. 3

CELL KEY TABLE

THE SERVICE OF PRODUCT NAME

| CRITERIA | | | CELL KEY |
|---|---|---|---|
| ZONE | WEIGHT | NUMBER PIECES | |
| ALL | ALL | 1 | 1 |
| | | 2-20 | 2 |
| | | 21-50 | 3 |
| | | 51-100 | 4 |
| | | 101-200 | 5 |
| | | 201-999 | 6 |
| ALL | 1-35 | 1-20 | 7 |
| | | 21-50 | 8 |
| | | 51-100 | 9 |
| | | 101-200 | 10 |
| | | 201-999 | 11 |
| ALL | 36-70 | 1-20 | 12 |
| | | 21-50 | 13 |
| | | 51-100 | 14 |
| | | 101-200 | 15 |
| | | 201-999 | 16 |

| CRITERIA | | | CELL KEY |
|---|---|---|---|
| ZONE | WEIGHT | NUMBER PIECES | |
| 3 | ALL | 1 | 40 |
| | | 2-20 | 41 |
| | | 21-50 | 42 |
| | | 51-100 | 43 |
| | | 101-200 | 44 |
| | | 201-999 | 45 |
| 3 | 1-35 | 1-100 | 46 |
| | | 101-500 | 47 |
| | | 501-999 | 48 |
| 3 | 36-55 | 1-10 | 49 |
| | | 11-30 | 50 |
| | | 31-50 | 51 |
| | | 51-100 | 52 |
| | | 101-999 | 53 |
| 3 | 56-70 | 1-30 | 54 |
| | | 31-60 | 55 |
| | | 61-100 | 56 |
| | | 101-999 | 57 |

| CRITERIA | | | CELL KEY |
|---|---|---|---|
| ZONE | WEIGHT | NUMBER PIECES | |
| 2 | ALL | 1 | 20 |
| | | 2-20 | 21 |
| | | 21-50 | 22 |
| | | 51-100 | 23 |
| | | 101-200 | 24 |
| | | 201-999 | 25 |
| 2 | 1-35 | 1-50 | 26 |
| | | 51-100 | 27 |
| | | 101-999 | 28 |
| 2 | 36-70 | 1-10 | 29 |
| | | 11-30 | 30 |
| | | 31-50 | 31 |
| | | 51-100 | 32 |
| | | 101-999 | 33 |

FIG. 4

CELL KEY TABLE

THE SERVICE OR PRODUCT NAME

| CRITERIA | |
|---|---|
| DESTINATION LOCATION | CELL KEY |
| ALL | 1 |
| ALBANY | 2 |
| BRIDGEPORT | 3 |
| CHICAGO | 4 |
| CLEVELAND | 5 |
| DENVER | 6 |
| LOS ANGELES | 7 |
| NEW YORK CITY | 8 |
| . | . |
| . | . |
| . | . |
| . | . |

| CRITERIA | |
|---|---|
| DESTINATION LOCATION | CELL KEY |
| MILFORD MONROE SHELTON STRATFORD TRUMBULL | 15 |
| BINGHAMTON ENDICOTT JOHNSON CITY | 34 |
| OAKLAND SAN DIEGO SAN FRANCISCO | 66 |
| . . . . . | . |

FIG. 5

VALUE KEY TABLE

| PERCENTAGE VALUE | CEILING $ VALUE | VALUE KEY |
|---|---|---|
| 0 | 0.00 | 0 |
| 1 | 0.00 | 1 |
| 1 | 0.20 | 2 |
| 1 | 0.40 | 3 |
| 5 | 0.00 | 10 |
| 5 | 0.30 | 11 |
| 10 | 0.00 | 30 |
| 10 | 0.40 | 31 |
| 15 | 0.00 | 40 |
| 15 | 0.40 | 41 |
| 20 | 0.00 | 50 |
| 20 | 0.40 | 51 |
| 20 | 0.50 | 52 |
| 20 | 0.60 | 53 |
| 20 | 1.20 | 54 |

| FLAT RATE DOLLAR AMOUNT | VALUE KEY |
|---|---|
| 1 | 75 |
| 2 | 76 |
| 3 | 77 |
| 4 | 78 |
| 5 | 79 |
| 10 | 84 |
| 11 | 85 |
| 12 | 86 |
| 15 | 89 |
| 20 | 94 |

USER SYSTEM INTERNAL INTERFACE DIAGRAM

DISCOUNT/SURCHARGE DATABASE

CUSTOMIZED DISCOUNT/SURCHARGE CONFIGURATION DATABASE

DISCOUNT DATA BASE

SURCHARGE DATABASE

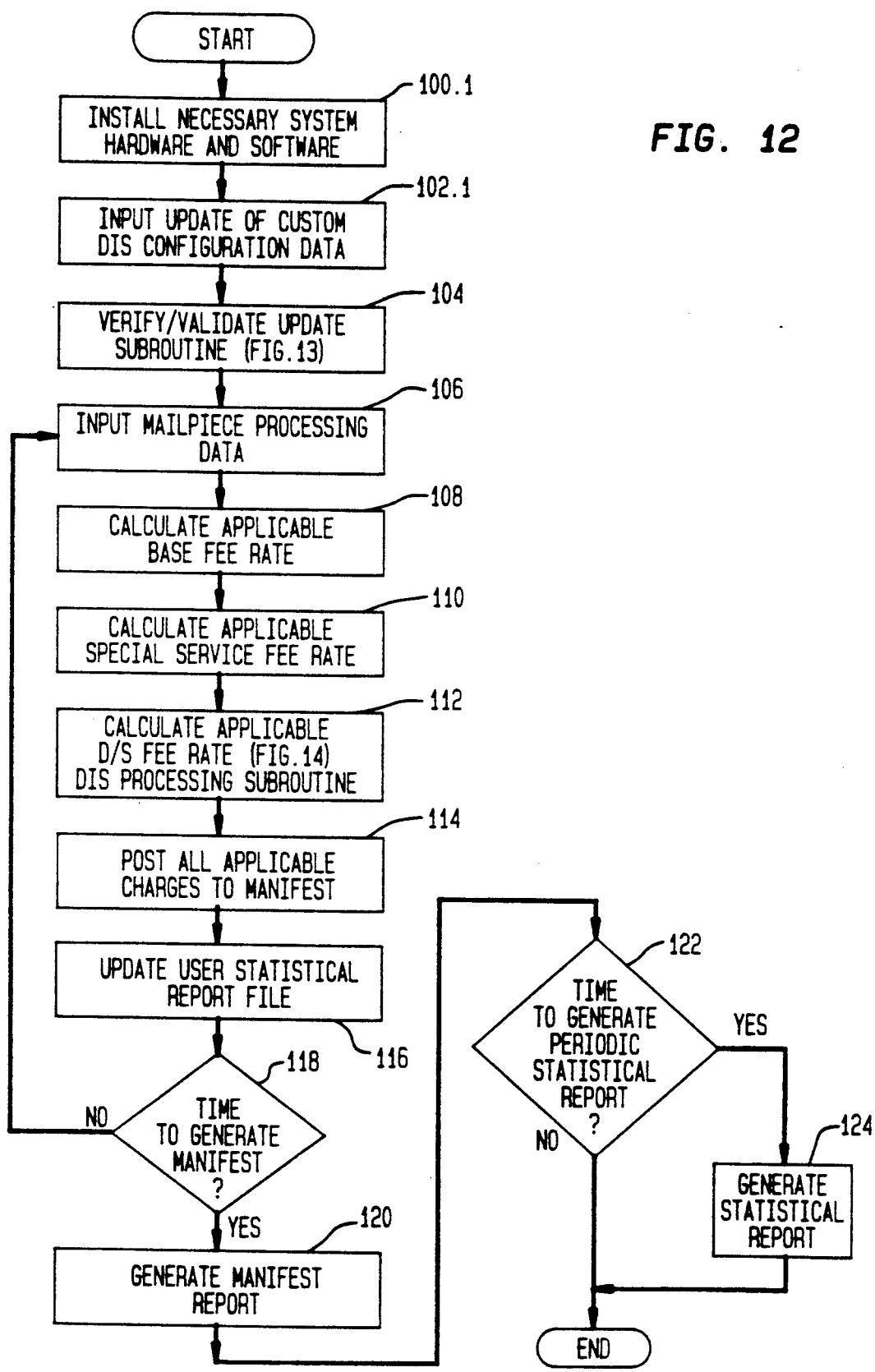

SURCHARGES SUBROUTINE

SURCHARGE ID & CALC.

DECODE, CHECK AND CALCULATE SUBROUTINE

DISCOUNT ID & CALC.

SKIP TO OVERLAP

SPECIAL SERVICES DISCOUNT SUBROUTINE

FLEXIBLE METHOD FOR APPLYING CUSTOMIZED RATING ADJUSTMENTS TO TRANSACTION CHARGES

BACKGROUND OF THE INVENTION:

The invention relates to data processing methodology and apparatus for effecting an improved customized rating adjustment to transaction charges. More specifically, this invention is directed to a process and a system for rapidly and reliably applying surcharges and discounts to transaction charges in a shipping system.

This Application is one of the following two (2) related, concurrently filed, U.S. patent applications filed by the same inventors and assigned to the same assignee of this application: Ser. No. 07/887,616 for a Flexible Apparatus and Method for Applying Customized Rating Adjustments to Transaction Charges; and Ser. No. 07/888,682, for a Flexible Method for Applying Customized Rating Adjustments to Transaction Charges.

It is well known in the carrier shipping industry to distribute standardized public rates for manifest mail carrier systems. Standard public rates are available to anyone who meets the basic conditions of doing business with a carrier. Carriers typically offer several standard classes of service. Rates may be based on service level, which typically represents a time of delivery (e.g. next day delivery, second day, etc.). Standard rates may also vary by destination, zip code or zone. They may also be determined by dimension (oversize) or by packaging (such as express carriers' letters).

Prior systems relating to carrier manifest systems for handling transaction charges are discussed in U.S. Pat. Nos. 4,499,545, 4,504,915 and 4,506,330, which are assigned to the assignee of the present application and are herein incorporated by reference.

U.S. Pat. No. 4,499,545, issued Feb. 12, 1985 to Daniels, et al., relates to a method and apparatus for controlling the ability of a user of a shipping system, or similar system for computing charges, to access code which is installed in the system for computing various fees for special services. A rate screen byte is provided and access is granted or denied to particular special services in accordance with the status of corresponding bits in the byte.

U.S. Pat. No. 4,504,915, issued Mar. 12, 1985 to Daniels, et al., relates to shipping systems, or similar systems for determining charges, also. Access to rates for particular classes of service is controlled by incorporating "pseudo rate charges" in the rate memory. The "pseudo rate charge" will vector the system to the routine for indicating that access has been denied when the user attempts to access a class of service which has not been ordered and paid for.

The above two patents differ substantially from the subject invention, at least in that they are related to inventions for granting or denying access to particular functionalities of the system, i.e. rates for particular classes of service or special services, for which rates the customer has not paid, while this invention relates to applying surcharges or discounts to charges determined by the system.

U.S. Pat. No. 4,506,330, issued Mar. 19, 1985 to Dlugos, relates to a shipping system, or similar system for determining charges, which includes a customized "zip to zone" memory. In shipping systems, one parameter upon which charges are based is the "zone" which is a measure of the distance items are to be shipped. Typically, such systems will include "zip to zone" conversion software which will compute a zone value from the zip code of the destination address. In the invention of the '330 patent, the system includes a customized "zip to zone" memory for altering the computation of the charges as though the shipment were made from a different originating location. A manual switch is provided allowing a user to select either the standard or the customized "zip to zone" memory.

Applicants note that none of the above described patents in any way suggest a system which includes a memory for storing discount/surcharge data, which is automatically applied to charges computed using standard rates.

In addition to the standard rates being offered by the carrier, a carrier may wish to offer a customer or user special discounted rates for use in its shipping system. Discounted (or incentive) rates are typically offered individually to preferred customers based on conditions set by the carriers. Often the carrier may establish a series of non-standard, discount rate charts. Only one of the rate charts would be activated for any particular shipper but different tables are activated for different shippers. Generally, the carrier may select a series of parameters (e.g. weight, zone) which can be used to build a discount rate chart. Typically, these parameters bear a relationship to the parameters used in determining the standard public rates and they are often calculated in part by taking a fixed percent off or a fixed dollar amount off of the published rate.

In these cases the carrier may individually negotiate "custom" rates with the shipper. The structure for such negotiated rates will be the same as the standard public rates but the values within the structure will vary from shipper to shipper. Typically these rates are reserved for high volume, national accounts and are renegotiated every one or two years.

A type of data processing device that illustrates application of custom rates is a computerized parcel manifest system, of which well known examples are the HAWK, A2000, A10000, marketed by Pitney Bowes Inc., Stamford, Conn.

In these prior systems, after negotiations, a contract was required to detail any of the customized rate adjustments which a carrier would grant to a shipper. These systems were limited in their capacity for growth, i.e., expansion of the system with respect to the number and type of criteria, because of the direct linkage to parameters used in the rate chart. Any time the customized rate chart was to change e g., vary applicable adjustment to the rate, it required about a forty-five (45) day turnaround due to testing requirements for each and every applicable rate.

Additionally, these systems did not allow the customer or carrier to figure out the total variance (discount/surcharge cost amount) between the custom adjusted rate and the standard public rate because the rate applied from the custom adjusted rate chart already incorporated the desired adjustment to the standard rate in the "customized rate". No method existed for backing out information about what the standard public rate corresponding to the discounted rate would have been or which specific criteria were utilized as rating criteria for applying the particular discount. It is desirable for shippers to have such information about their own shipping practices. Shippers wish to analyze and compare the benefits of participating in the custom adjusted rate programs offered by particular carriers in order to optimize such participation benefits. Additionally, such information is useful to shippers for the purpose of billing back the cost of handling charges to their customers or internally to other departments within the same company (if the shipping department becomes a cost center). Some shippers may prefer to bill the customer without passing along the discount savings to which the shipper was entitled.

Prior customized rating systems existed mainly in two forms: The first type of system, as partially described above, customized rating by utilizing a customized rate chart for applying discounts (or surcharges). This customized rate chart would have incorporated within it at the appropriate locations the desired customized rate in place of the typical standard public rate.

A second type of system customized rating by permitting a customer to enter discount or surcharge fee amounts manually into the system. An example of this type of system is discussed in U.S. Pat. No. 5,072,397, also assigned to the assignee of the present invention and is herein incorporated by reference. U.S. Pat. No. 5,072,397, issued Dec. 10, 1991, to Barns-Slavin, et al., relates to a carrier management system which enables determination of charges with discounts. Applicable discounts are based upon a limited number of discount criteria as determined and entered manually by the user for the transaction. Manual entering of adjustments to the base rate proved to have very limited capability due to human error, user tampering with rates, and length of time necessary to enter numerous discount schemes for a transaction. Due to lack of integrity in a manifest generated as a result of manual input in these prior systems, the carrier was required at considerable cost to additionally audit and police the use of discounts as implemented by the user/customer. The carrier would not be inclined to treat the manifest as a billing document due to this lack of integrity. Typically auditing procedures entailed cross-reference back to a contract previously negotiated between the carrier and the shipper. Since cross-referencing required a manual look up of the negotiated customized rate, the pattern of customized rate adjustments offered by the carrier to the customer would be limited in scope in order that it would be manageable for the carrier to conduct its auditing procedures. The carrier would avoid offering numerous discount patterns to customers in efforts to ensure less cumbersome auditing procedures and to prevent auditing procedures from becoming error prone.

It is therefore an object of the present invention to provide a methodology and system whereby an authorized user can rapidly obtain accurate transaction charges reflecting any applicable customized rating adjustments.

It is a further object to provide such capability with only minor changes in presently accepted parcel manifest systems.

SUMMARY OF THE INVENTION

According to the invention, a method is provided for determining charges for a class of transactions. The method includes:
a) partitioning the class into cells in accordance with predetermined criteria;
b) providing a customer with apparatus for computing base rates for the transactions, the apparatus being responsive to configuration data to apply predetermined discounts or surcharges to the transactions, the configuration data defining correspondences between the discounts or surcharges and the cells, and the configuration data has a predetermined form and is communicated to the apparatus through a selected medium;
c) defining custom discount rates for the customer;
d) transmitting data defining the custom discount rates to a data processing center;
e) at the data processing center, inputting the defining data to structure for translating the defining data into corresponding configuration data in the form, and
f) transmitting the corresponding configuration data to the apparatus through the medium to implement the custom discount rates.

In accordance with another aspect of the invention, a customer is provided with an apparatus with the further capability of providing statistical reports about the customer's purchases of goods or services. Thus, the supplier may consider the statistical reports in selecting the criteria, or in negotiating the custom discount rates with the customer.

In accordance with another aspect of the invention transactions can include shipment of parcels.

BRIEF DESCRIPTION OF THE DRAWINGS

FIG. 2 is an example of a Discount/Surcharge Order Form.

FIG. 2A is an example of a statistical report 20.1 sent from the data center 14 to the carrier 12.

FIG. 2B is an example of a statistical report 22.1 sent from the user 10 to the carrier 12.

FIGS. 3 and 4 are examples of Cell Key Table 24.1.

FIG. 5 is an example of a Value Key Table 26.1.

FIG. 12 is a schematic flow chart depicting the data processing methodology and structure in accordance with the principles of the present invention for a customized rating adjustment system.

DESCRIPTION OF PREFERRED EMBODIMENTS

Figure 1:
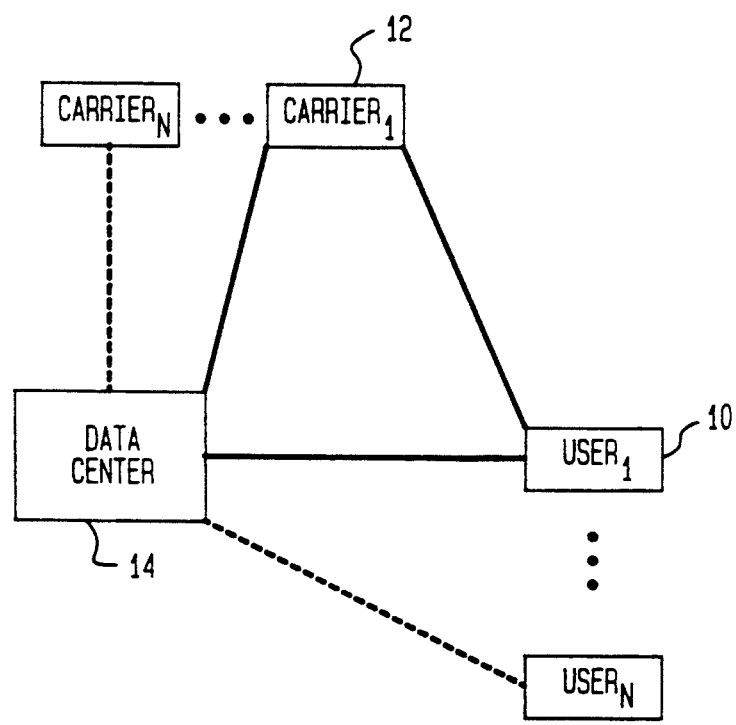
FIG. 1 is a functional block diagram illustrating the relationship between the data center 14, carrier 12 and user 10.

With reference to FIG. 1, a plurality of user stations 10 are shown designated as User $_1$ to User $_N$. These user stations 10 are coupled to a data center 14 by means of a communication link for the purposes of exchanging information. Communications between users 10 and data center 14 typically include delivery of Programmable Read Only Memories (PROM'S) or discs for storing rate charts and/or discount or surcharge configuration data to users 10 for installation in manifest systems or the like. In another embodiment of the subject invention rate charts and/or discount or surcharge data is downloaded to such systems over a high speed data link. Data center 14 in turn is coupled by means of a secure data line or the like to the carrier service 12. A plurality of carriers 12 are shown designated as Carrier $_1$ to Carrier $_N$. The overall system, as illustrated in FIG. 1, is intended to support multiple carriers 12 and multiple user stations 10 through the data center 14. For purposes of convenience, discussion of the functioning of the data center 14 and a single carrier 12 and a single user station 10 will be made.

User station 10 typically requests a preference for custom discount rates from carrier 12. Carrier 12 typically has a representative negotiate the terms of the customized rates. In so doing, the representative will fill out a discount/surcharge order form 18 similar to the one shown in FIG. 2. The representative will review statistical data in the form of a statistical report 22.1 similar to the one shown in FIG. 2B, if available, to use as a basis for deciding what discounts or surcharges should be given to user 10, as well as, what the criteria for applying the discount or surcharge should be. This report 22.1 typically provides information about that particular user's 10 transactions for a given period of time. For example, assuming from the report 22.1 the representative notes that over a period of time the user had a high volume of transactions to a particular zone and may decide the user 10 should be given a discount rate for those transactions in the future. It will be understood that this statistical report 22.1 is merely representative of what such a report 22.1 would include and other variations for content and layout are also contemplated. In preparing the order form 18, the representative will select one or more Cell Keys 24.2 and Value Keys 26.2 which correspond to discounts and surcharges for a selected carrier service.

The representative then enters a Cell Key-Value Key pair into corresponding locations in form 18 for the selected service to indicate that transactions in the selected service which satisfy the criteria corresponding to the selected Cell Key 24.2 (i.e. are within that Cell) receive the discount or surcharge corresponding to the associated Value Key 26.2. An example of Cell Keys 24.2 which may be entered into Cell Key Tables 24.1 is found at FIGS. 3 and 4. An example of a Value Key 26.2 which may be entered into Value Key Tables 26.1 is found at FIG. 5. For example, the representative determines that for transactions containing between 1 and 50 pieces going to a zone 2 destination with individual package weights between 1 and 35 pounds a 10% discount will apply. The representative would enter a Cell Key of 26 from FIG. 3 and a Value Key of 30 from FIG. 5. Cell Keys 24.2 and Value Keys 26.2 are the terms used by the inventors herein to represent the encoded information which can be decoded into the corresponding specific set criteria which must be met for a particular discount or surcharge to apply. Typical Cell Key criteria may be based upon parameters such as, for example, zone, weight, number of pieces, destination, location and class of goods. Typical Value Keys may be based upon a flat rate dollar amount or the lesser of a percentage value or a ceiling dollar value. Typically a Cell Key or Value Key is represented by a numerical value.

It is also within the contemplation of the subject invention that criteria for various Cells could be based upon the past system usage. For example, a discount could be based in part upon the total number of transactions since the last update. A person of ordinary skill of the art could easily provide a counter to generate this parameter; and Cells could then be defined having criteria based on that parameter.

Based on the criteria used for determining application of a Discount/Surcharge the representative will pick a Cell Key 24.2 and enter a Cell Key 24.2 into the order form 18. Based on the value of the Discount/Surcharge to be applied to the user 10, the representative will select a Value Key 26.2 and enter it into the order form 18. The representative will repeat this selection of Cell Keys 24.2 and Value Keys 26.2 until all criteria are represented for each service and or special service as it relates to the particular user 10.

In order to decrease the amount of data entry and potential for human errors it is contemplated that a "tile" representing a pattern of Cell Keys (discounts/surcharges) may be used by the representative. The pattern as represented in the tile may be based on trend analysis conducted by the carrier 12 which indicates repetitive patterns in the application of discounts or surcharges which were typical distributions of discounts or surcharges given other similar users 10 in the past. When a tile is used, the representative will only have to select the appropriate Value Keys for the particular Cell Keys shown within the tile pattern.

Referring back to FIG. 1, when the order form 18 is completed, it will then be forwarded to data center 14 by the representative. Transmission of the order form 18 may be in any of a number of suitable mediums. For example, a plain piece of paper, or in the form of an electronic telecommunication (e.g. over phone lines or by wireless communications), or by facsimile. Data center 14 is preferably available for receiving order forms 18 twenty-four (24) hours a day. Upon receipt of an order form 18, data center 14 must verify that the representative is authorized by the carrier 12 to give user 10 discount or surcharge preferences. If the representative is unauthorized, data center 14 shall reject the order and notify the carrier 12. Assuming the representative is authorized, data center 14 must convert the data contained in the order form 18 into the appropriate update format to be sent to the user station 10 (sometimes hereinafter "user 10"). Data center 14 also will generate a security access code specifically for the user station 10 for the particular update. It does so by using the prior security access code information, such as a seed number that was stored at the last update, for generating the security access numbers in accordance with a secure algorithm. The update which will be transmitted to the user station 10 shall include the order form data, security access code, new seed number and effective date for update. Data center 14 will determine the suitable output method and media for transmitting the update to the user 10 (i.e. electronic transfer, floppy, PROM) and then transmits the update accordingly.

Upon transmission of the update information from data center 14 to user station 10, user 10 will load the update information into its system. User station 10 (shown in FIG. 6) will check to ensure that the update information is authorized by comparing the security access code contained therein. The user system generates a security access code internally using previously stored seed number and compares it to the security access code on the update. If the update is valid, the system will accept and load the data, including the new seed for the next update, otherwise, it will reject the update.

The system of user 10 generates manifest reports to accompany shipments being transported by the carrier 12. The contents of a manifest report will not be discussed here in detail for they are well known in the industry. The shipment is typically transported by either an air or ground service.

The system of user 10 is also capable of generating periodic statistical report 22.1 for transmission to the carrier 12 by any suitable means. This statistical report 22.1 may be considered by carrier 12 in its determination of future discounts or surcharges to be made available to the user 10 as discussed above. Modification of existing systems to provide such statistical reports is well within the skills of a person of ordinary skill and need not be discussed further for an understanding of the subject invention.

In addition to the above responsibilities, the third party who manages the data center 14, in response to a user 10 request for system installation, would also be responsible for installing and maintaining the system hardware, software and Discount/Surcharge Data Bases (to be described in greater detail below) at the site of user 10. The data center 14, additionally, shall maintain a user 10 data base which contains statistical information concerning the discount/surcharge data, baseline effective date for order data, security access codes, and seed numbers relating to the individual users 10. At any given time, the data center 14 shall be capable of generating a statistical data report 20.1 based upon the desired relevant data to be forwarded to the carrier for trend analysis of the application of discounts and surcharges and for auditing purposes. The report 20.1 is intended to allow the carrier 12 to view overall discount and surcharge patterns, typically summarizing the patterns made to all users 10. An example of what a statistical data report 20.1 from the data center to the carrier would look like is shown in FIG. 2A. It will be understood that statistical report 20.1 is representative of what a report 20.1 would include, however, other variations for content and layout are also contemplated.

User System

Figure 6:
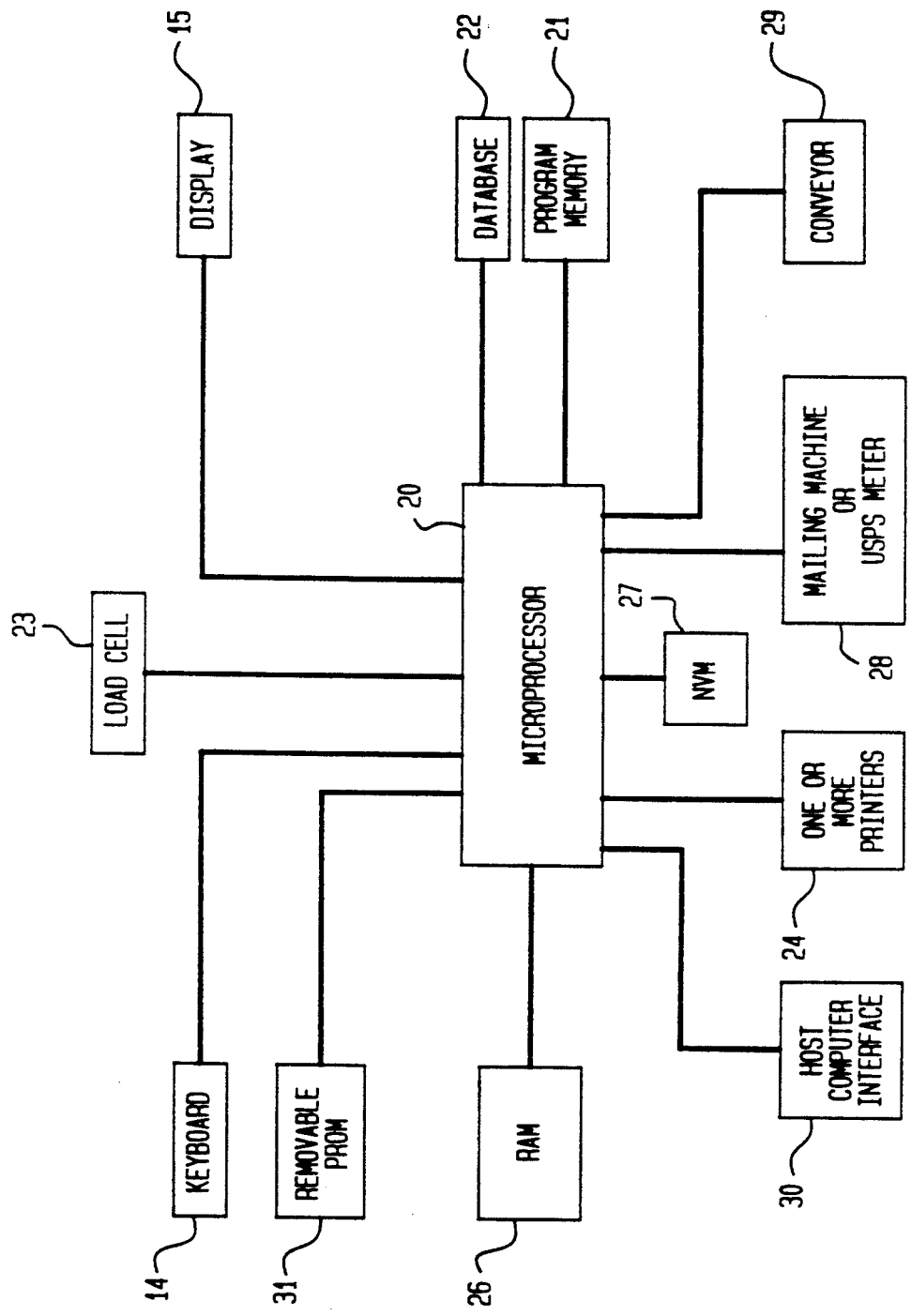
FIG. 6 is a block diagram of a preferred user station 10.

FIG. 6 is a block diagram of the hardware configuration of the user station 10 of the present invention. A substantially similar hardware configuration is shown in the Barns-Slavin, et al. patent previously mentioned. The system incorporates a microcomputer including a microprocessor 20 having a nonvolatile program memory 21 containing the program for operation of the system, and a nonvolatile data base memory 22 having stored therein rate information of all carriers for which the system is expected to determine cost data. This latter memory is preferably replaceable in order to be able to update rate information, change or add carriers and/or classes of service, etc. A load cell 23 coupled to the platform (not shown) applies data to the microprocessor related to the weight of a parcel on the platform. It is contemplated that any suitable scale device may replace load cell 23.

The system further includes one or more printers 24, one of which may be an external printer, and another of which may be internal to the system, if desired. The system also includes a keyboard 14 and a display 15 and each may be remotely situated from the rest of the system. The system may have working RAM 26, and further NVM 27, and may be adapted to be connected to a mailing machine or USPS meter 28, a conveyor 29, and/or a host computer interface 30. The system memory may be separate memory units or form one memory unit. It is contemplated that the system can work in other environments, including but not limited, to a network environment.

The system in accordance with the invention is adapted to determine mailing or shipping charges for a parcel placed on a platform above the load cell, and may be adapted to print a manifest, label, tag, etc. related to the shipping of the parcel, and/or it may include internal registers for accounting for the shipping of such parcels.

Figure 7:
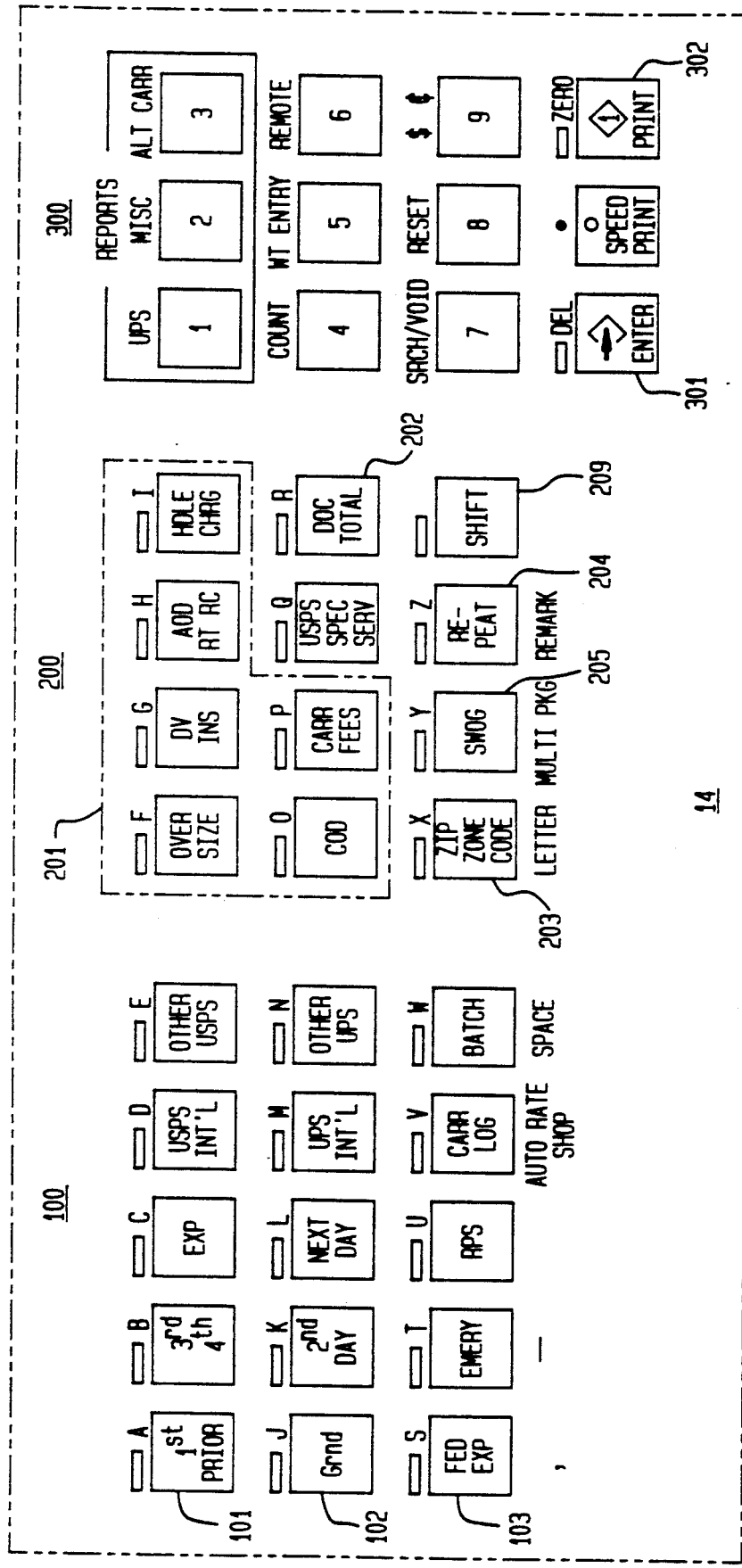
FIG. 7 is an illustration of the keyboard of the user station 10.

Referring now to FIG. 7, therein is illustrated the keyboard 14 of a preferred carrier management shipping system in accordance with the invention. The keyboard includes three sets 100, 200, 300 of keys. Each of the keys has a label printed thereon corresponding to the primary function of the key. Secondary and tertiary functions are printed above and below the keys showing additional functions that depression of the associated keys may enable.

The group 100 of keys includes three rows 101, 102, 103 of keys, each row having five keys. These keys are known as the carrier/class keys, since their primary function is concerned with the selection of the carrier to use for shipping a given parcel, or the class of shipment that is to be employed for the shipment. For example, the keys of the first row 101 may be concerned with shipments by the USPS, and depression of any of these keys automatically selects shipping via USPS, with the specific class being determined by the key in the row that is depressed. Thus, depression of the first key in the row indicates that calculations should be made on the basis of first class or priority class mailing. These calculations are based upon the weight of the parcel. If priority class is to be selected, by the depression of this key, a response will be made to a later prompt for an input of the zip or zone of destination. Similarly, depression of the second key selects third or fourth class mail, depression of the third key selects express mail, depression of the fourth key selects USPS international mail, and depression of the fifth key in the row selects other classes, the specific selection of other classes being in response to prompts on the display.

Depression of a key of the second row 102 of keys automatically selects UPS as the carrier, with the various keys of this row hence being directed to various classes of shipping via UPS.

In the third row 103 of keys, the first three keys are directed to the shipping costs of a group of carriers, such as Federal Express, Purolator, DHL, Emery, etc., so that depression of the corresponding key enables the system to determine the shipping charges, for the current parcel, of each of these carriers. Various shipping classes may also be analyzed in response to the depression of these keys, such as, for example, drop shipments.

The fourth key in the row 103 enables the user to select infrequently used carriers and/or classes from a menu that appears on the display. Such selection may require the user to calculate the shipping charges, since the rates for these carriers and/or classes may not be stored in the system. Selection of the last key in the row 103 enables the user to process a group of parcels as a single transaction.

The second group 200 of keys includes a group 201 of toggle keys enabling the user to select or deselect special services. These keys may include, for example, a key for oversize parcels to require shipping charge determination to be also based upon the size of the parcel, a key requiring addition of insurance charges, a key including charges for a return receipt, a key for COD shipments, a key to call a menu for special services for alternate carriers, etc.

In addition, this group 200 of keys includes a key 202 to effect printing of accumulated values for a group of parcels, a key 203 to change the zip or zone identification, a key 204 to repeat the data of the previous transaction and a key 205 to process the parcel for shipment with other goods. In addition, the group 200 includes the SHIFT key 209 which enables selection of second and third functions of various ones of the other keys.

The third group 300 of keys enables numeric entry by the user, in response to prompts for such entries from the display, and also includes an ENTER key 301 for enabling entering of certain responses, and a PRINT key 302 for causing the printing of the manifest, label, tape, and/or the entering of data into internal registers, etc.

Most of the keys also have a second function printed above the key, the second function being effected upon depression of the SHIFT key 209 and the respective key. In addition, a third function is printed below a number of the keys, the third function being effected by depression of this key along with the SHIFT key (only in the event that depression of the key for effecting the second function would not have resulted in a valid entry). If depression of a key for performing a primary function would have been invalid, such depression causes the selection of the second function, without depression of the SHIFT key, if the respective second function constitutes a valid response to a prompt at that time.

System Internal Interface Diagram

Figure 8:
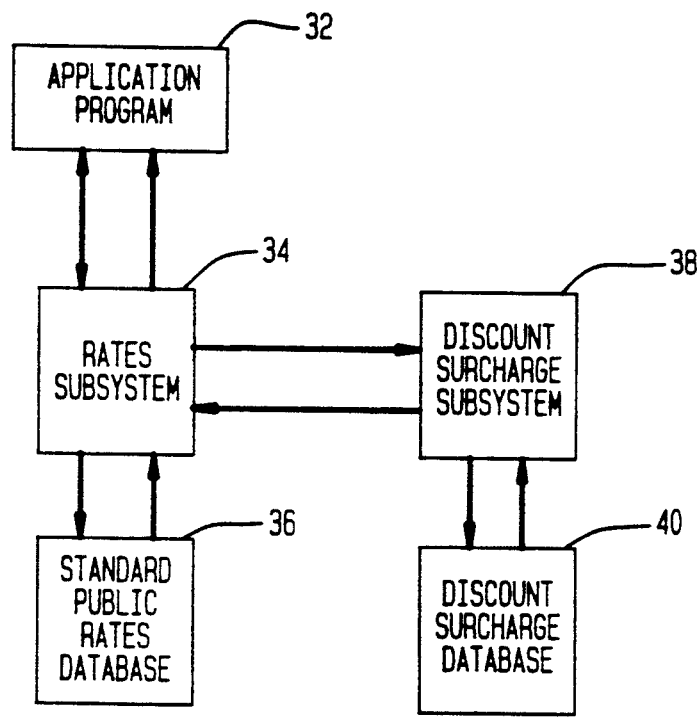
FIG. 8 is a functional block diagram of the user station 10 internal interface system.

Referring now to FIG. 8, the user station 10 stores in a corresponding memory the application program 32, the rates subsystem 34, the standard public rates data base 36, the discount/surcharge subsystem 38 and the discount/surcharge data base 40. The application program 32 calls the rates subsystem 34 when performing rate calculations for a given transaction. The rates subsystem 34 accesses the data in the standard public rates data base 36 in order to calculate the actual base rate. The interaction between the application program 32, the rates subsystem 34 and the standard public rates data base 36, is well known in the area of parcel manifest systems and further discussion concerning such is not necessary.

In the present invention, the rates subsystem 34 will call the software referred to as the discount/surcharge subsystem 38 when performing calculations of discounts or surcharges. The discount/surcharge subsystem 38 will reference the data in the discount/surcharge data base 40 in order to calculate the appropriate discount or surcharge. This calculated amount is then passed back from the discount/surcharge subsystem 38 to the rates subsystem 34 which in turn returns that information back to the application program 32. Rates subsystem 34 typically calculates rates for single piece and consolidated shipments. Rates subsystem 34 calls discount/surcharge subsystem 38 for both single piece and consolidated shipments discounts/surcharges.

Figure 9:
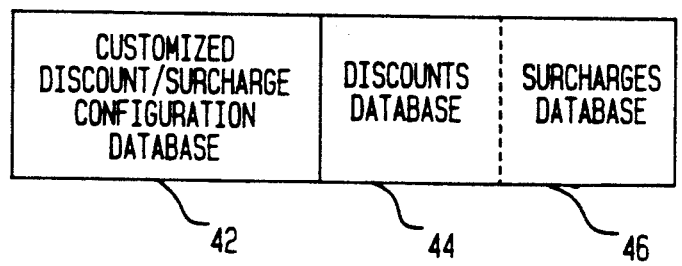
FIG. 9 is an expanded schematic depiction of the Discount/Surcharge Data Base of FIG. 8.

In FIG. 9, an expanded view of the contents of Discount/Surcharge Data Base 40 are shown. Discount/Surcharge Data Base 40 is preferably comprised of three smaller data bases which are preferably decoupled from one another (By "decoupled" herein is meant that the data bases are so structured, physically and logically, that each data base can be updated with minimal or no impact on the others). The first data base is Customized Discount/Surcharge Configuration Data Base 42. The second data base is Discounts Data Base 44 and the remaining data base is Surcharges Data Base 46. Preferably, data bases 42, 44 and 46, are "decoupled" or "individualized" while control over their use in the user system and their compatibility with existing systems is preserved. Preferably, each data base is compatible with replaceable non-volatile data base memory 22. It is contemplated that non-volatile data base memory 22 would be in the form of a programmable read-only memory device (PROM). (The terms data memory and PROM being used herein as fully equivalent). Generally, Discounts Data Base 44 and the Surcharges Data Base 46 would be the same on all customer systems. Preferably, only the Customized Discount/Surcharge Configuration Data Base 42 would be individualized or customized to a specific customer order 18.

Figure 10:
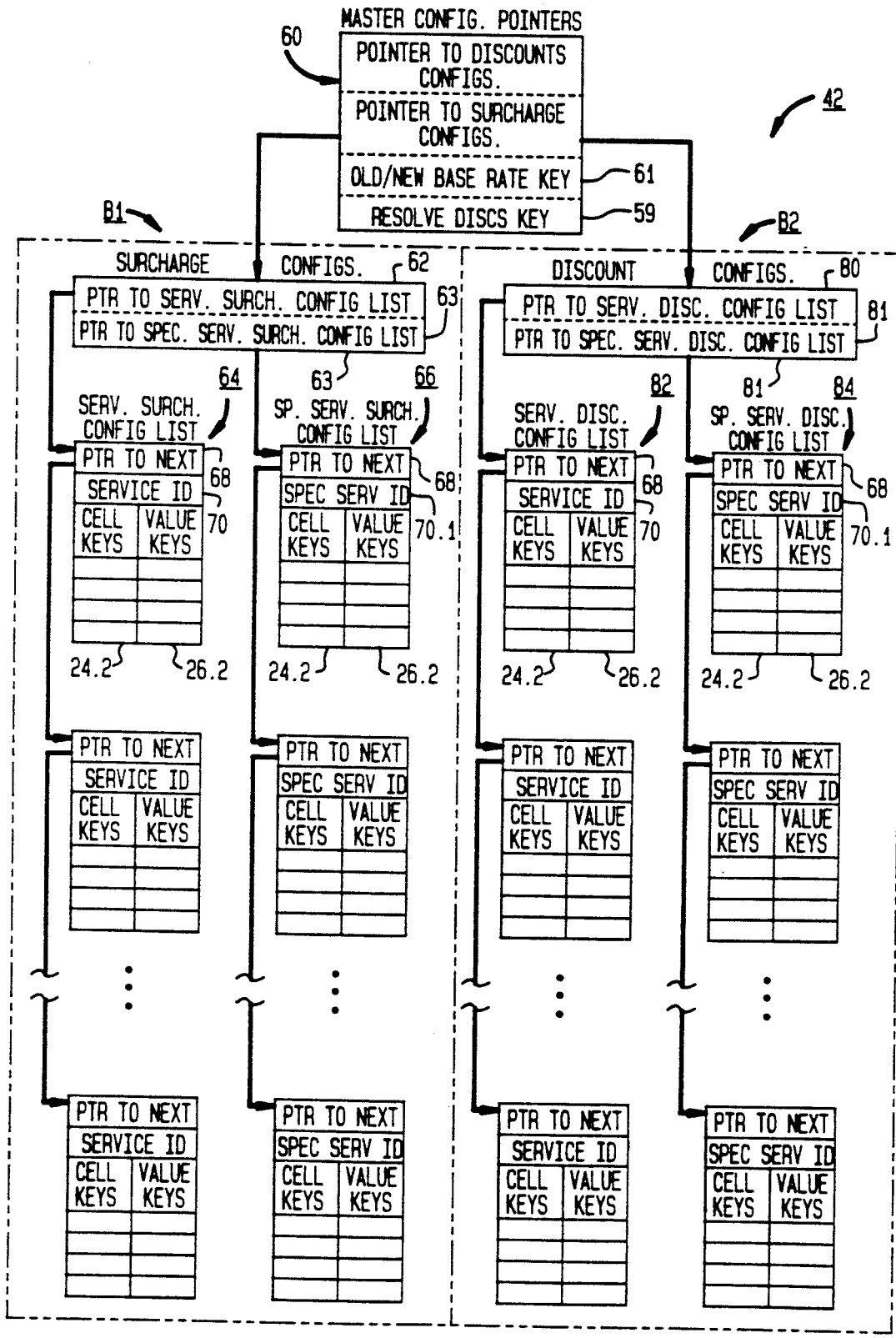
FIG. 10 is an expanded schematic depiction of the contents of the Customized Discount/Surcharge Configuration Data Base of FIG. 9.

In FIG. 10, a more detailed showing of the contents of the Customized Discount/Surcharge Configuration Data Base 42 is presented. Contained within the Customized Discount/Surcharge Configuration Data Base 42 are Master Configuration Pointers 60. One of the pointers 60 is a pointer to Discount Configurations B2 and the other pointer is to Surcharge Configurations B1. The configuration structures for surcharges are similar to those for discounts and therefore for the purposes of convenience only a description of the Surcharge Configurations B1 will be made. The Resolve Discounts Key 59, within Master Configuration Pointers 60, is employed by the system in order to direct the system to an appropriate routine for resolving multiple discounts in accordance with carrier specifications. Also contained within the Master Configuration Pointers 60, is the Old/New Base Rate Key 61, a flag, which will indicate which standard public rate chart to use when calculating the base rate (i.e., either the most current or the one just prior to the current).

Within the Surcharge Configurations B1 there is a Pointer to Service Surcharge Configuration List 62 and a Pointer to Special Service Surcharge Configuration List 63. The Pointer to Service Surcharge Configuration List 62 points to the first structure of Service Surcharge Configuration List 64 (a linked list of structures or entries). Within each structure of Service Surcharge Configuration List 64 is a structure which contains: Pointer to Next 68, Service ID 70 and a plurality of Cell Keys 24.2 and Value Keys 26.2 pairs. The number of Cell Keys 24.2 and Value Keys 26.2 contained in each structure in Service Surcharge Configuration List 64 may vary from 1 to N. The Pointer to Next 68 will point to the next structure in Service Surcharge Configuration List 64 if one exists. Numerous structures in Service Surcharge Configuration List 64 may be linked together as the need arises rather than a fixed number of entries. This linked list will enable the system to have as many or as few structures as required for expanding or modifying the system. A structure in Service Surcharge Configuration List 64 exists for each particular service to which a user 10 is to be charged a surcharge. If no surcharge is to be applied to a service, then no entry will exist for that service. The Service ID 70 is used to distinguish each structure in Service Surcharge Configuration List 64 by service.

Pointer to Special Service Surcharge Configuration List 63 points to the first structure of Special Service Surcharge Configuration List 66. Contained within each structure of Special Service Surcharge Configuration List 66 is a structure which contains: a Pointer to Next 68, Special Service ID 70.1 and a collection of Cell Keys 24.2 and Value Keys 26.2 pairs. These elements all function the same as previously described with respect to the Service Surcharge Configuration List 64.

It is within the contemplation of the subject invention that the Configuration Lists 64 and 66 may contain direct pointers to the corresponding entries in the Cell Key Tables 24.1 and Value Key Tables 26.1, instead of Cell Keys 24.2. This would increase system speed by eliminating the need to decode Cell Keys. However, the use of Cell Keys is preferred to decouple the Custom Discount/Surcharge Configuration Data, since this greatly simplifies updating. Generally, the need to update Surcharge data occurs more often than for that of Discount data. It is also contemplated that the system may use an array instead of using a linked list of structures and Pointer to Next 68.

Figure 11A:
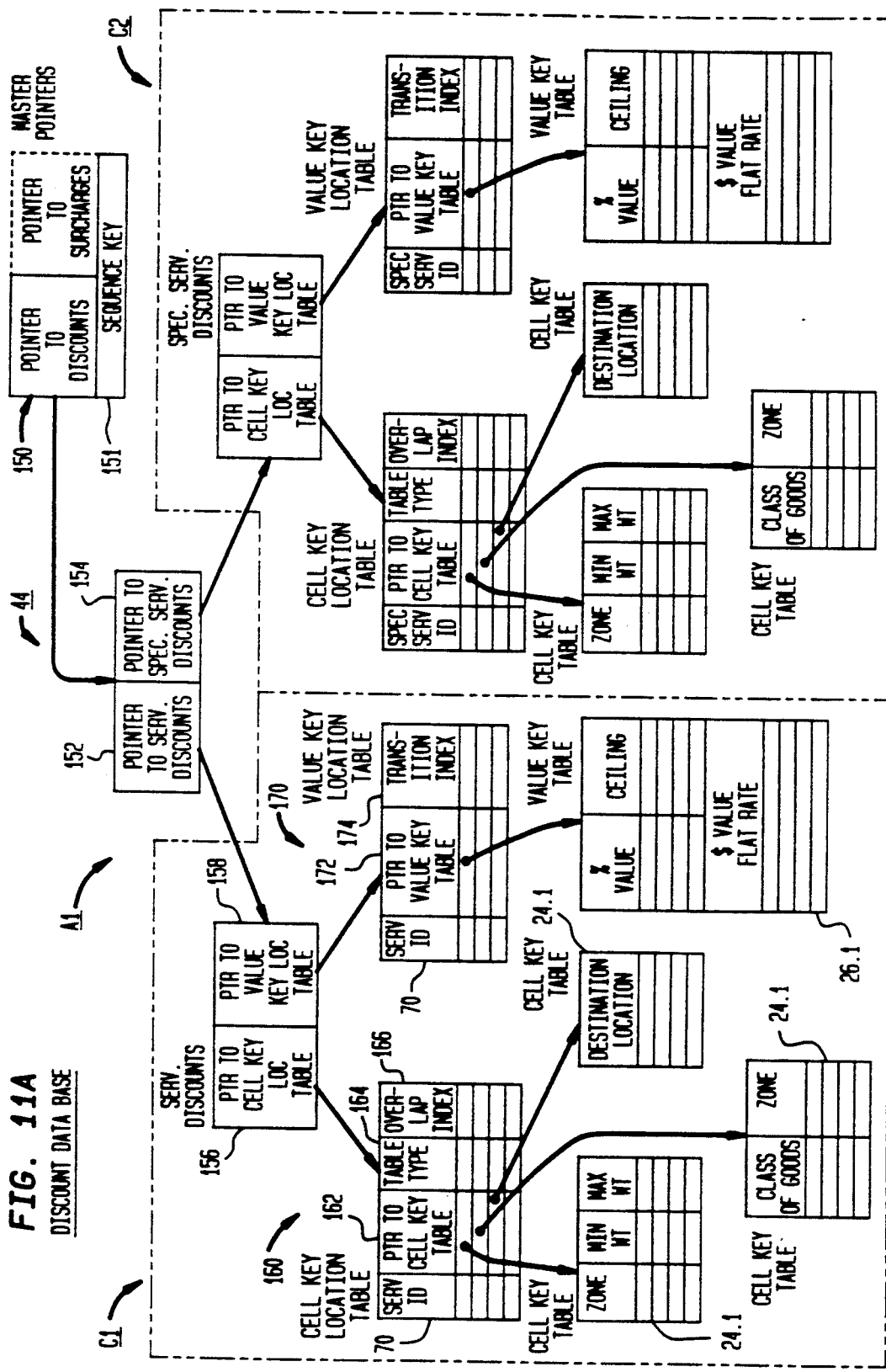
FIGS. 11A and 11B are an expanded schematic depiction of the first and second half of the Discount/Surcharge Data Base of FIG. 9.
Figure 11B:
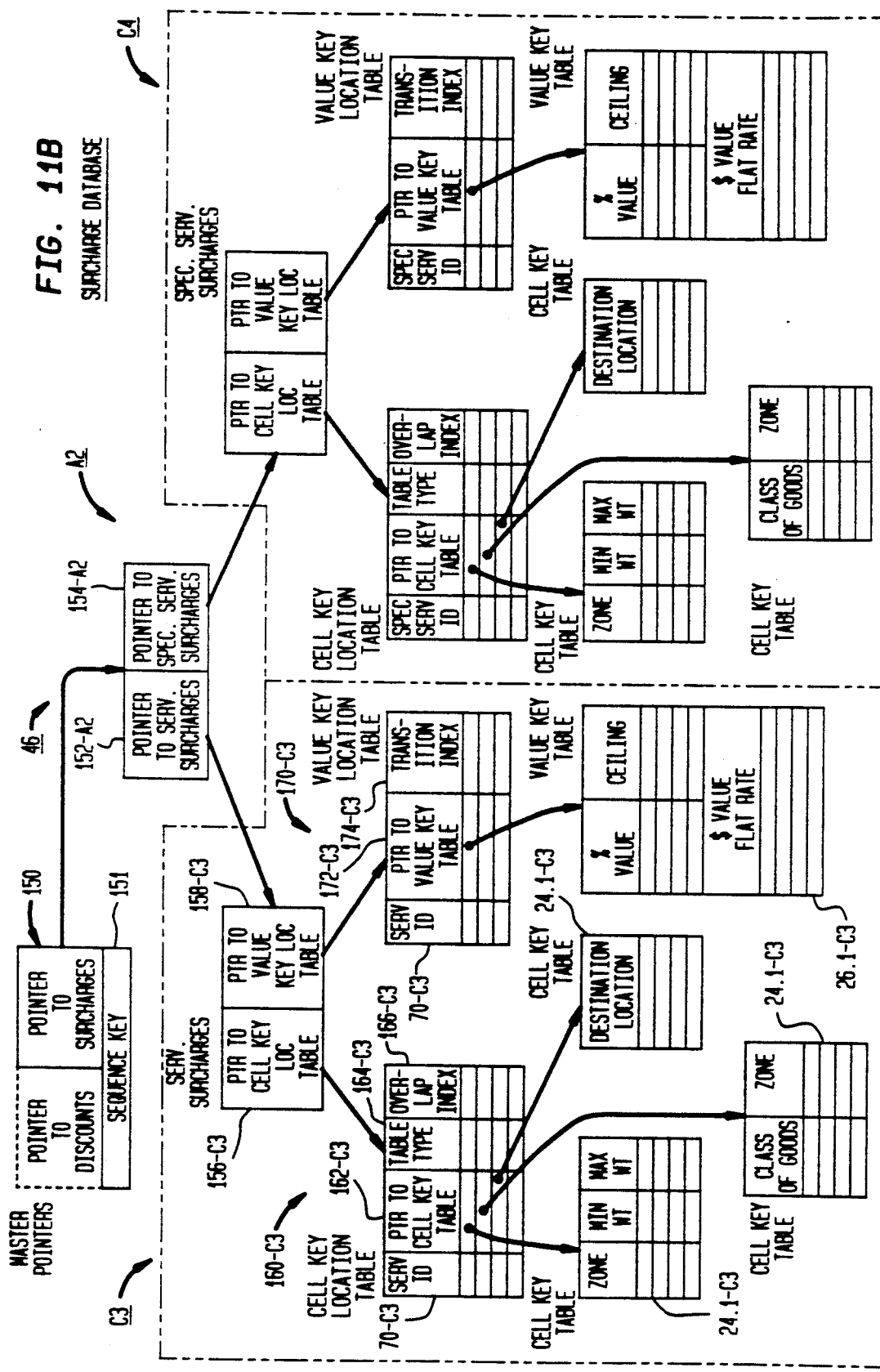

In FIGS. 11A and 11B, a more detailed showing of the contents of Discounts Data Base 44 and Surcharges Data Base 46 is shown. Contained within Discounts Data Base 44 and Surcharges Data Base 46 are Master Pointers 150. One of pointers 150 is a Pointer to Discounts A1 and one is a Pointer to Surcharges A2. Master Pointers 150 also includes Sequence Key 151 which will indicate the order in which to process surcharges or discounts, as will be described below. The structure of Discount Data Base 44 is similar to that of the structure of Surcharges Data Base 46 and therefore for the purposes of convenience only a description of Discount Data Base 44 will be made.

The Pointer to Discounts within the Master Pointers 150 points to the location of Pointer to Service Discounts 152 and Pointer to Special Service Discounts 154. The Pointer to Service Discounts 152 points to Service Discounts C1 (all the discount criteria and values that can be applied to services). The Pointer to Special Service Discounts 154 points to Special Service Discounts C2. The structure of the Service Discounts C1 is similar to that of the Special Service Discounts C2 and therefore for the purpose of convenience only a description of Service Discounts C1 will be made.

Within Service Discounts C1 is Pointer to Cell Key Location Table 156 and Pointer to Value Key Location Table 158. Pointer to Cell Key Location Table 156 points to Cell Key Location Table 160 for the purpose of locating via pointer the Cell Key Table for each service. Within Cell Key Location Table 160 is a plurality of Service ID 70, Pointer to Cell Key Table 162, Table Type 164 and Overlap Index 166.

Service ID 70 as discussed previously in relation to the Customized Discount/Surcharge Data Base 42, are used to indicate the particular service to be matched with the selected service ID 71. Pointer to Cell Key Table 162 points to a Cell Key Table 24.1 to be used for the service. The contents of Cell Key Table 24.1 as previously described may vary from one Cell Key Table 24.1 to the next. Table Type 164 is a field which identifies the particular criteria variables listed in the corresponding Cell Key Tables 24.1 (e.g. zone, minimum weight, maximum weight, class of goods, destination). It also indicates during Surcharge Processing or Discount Processing whether the Surcharge or Discount is to be applied against a) the Base Rate or b) the Base Rate plus other Surcharges. Overlap Index 166 is used to indicate Cell Keys 24.2 which relate to an overlap area due to an overlap of criteria variables. A more detailed discussion of the use and functionality of the Overlap Index 166 will be provided below.

Referring back to Pointer to Value Key Location Table 158, it points to Value Key Location Table 170 whose function is to locate or identify the Value Key Table 26.1 to be used for a particular service. Within Value Key Location Table 170 is a plurality of Service ID 70, Pointer to Value Key Table 172 and Transition Index 174. Service ID 70 functions in the same manner as previously discussed. Pointer to Value Key Table 172 points to a Value Key Table 26.1. The contents of Value Key Table 26.1 as previously described, may vary from one Value Key Table 24.1 to the next (e.g. the percentage value or flat rate dollar value may differ). Transition Index 174 is a field which indicates the transition point in the Value Key Table 26.1 at which Value Keys 26.2 cease to relate to a percentage value and begin relating to a flat rate dollar value. A more detailed discussion of the use and functionality of the Transition Index 174 will be provided below.

It will be recognized that Lists 64, 66, 82 and 84 (FIG. 10) correspond to the information provided by the representative on form 18, while Cell Key Tables 24.1 correspond to the criteria, as illustrated in FIGS. 3 and 4 and Value Key Tables 26.1 correspond to Values as illustrated in FIG. 5. As will be described more fully below, the system will, for each transaction: determine which, if any, configured Cell Keys (those in the Configuration List not in the Discount Data Base 44 or the Surcharge Data Base 46) apply to the service (or special service) provided in the transaction, determine if the transaction satisfies the criteria for any of the applicable Cell Keys 24.2, if so, identify the Value Keys 26.2 paired with the applicable Cell Keys 24.2, recover the Values for the paired Value Keys and apply the Values as discounts or surcharges, as appropriate, to a Basic Charge determined for the transaction in accordance with Standard Public Rates Data Base 36.

High Level Flow

FIG. 12 (High Level Flow) is a flow chart illustrating the typical high level operational flow of a user station 10 for applying customized rating adjustments in accordance with the present invention as described above in relation to FIG. 1.

In one of the many practical applications of the present invention, the user would have installed the necessary system hardware and software at step 100.1. A new customer or user may have to install the entire hardware and software. The system would include application program 32, rates subsystem 34, Standard Public Rates Data Base 36 for carriers, discount/surcharge subsystem, Discount/Surcharge Data Base 40, a seed number for generating a security access code and override code for security. An older customer who already possesses a prior manifest carrier system may only have to add an application and rates subsystem modified in accordance with the subject invention and Discount-/Surcharge Data Base 40. At step 102.1 an update of Customized Discount/Surcharge Configuration Data 42 is input into the system. It will be understood by those skilled in the art that it can be entered in the form of a floppy, a PROM, any other suitable medium, or by electronic communication. The update information will then be processed at step 104 by entering a Verified/-Validated Update Subroutine which is shown in greater detail in FIG. 13.

Figure 13:
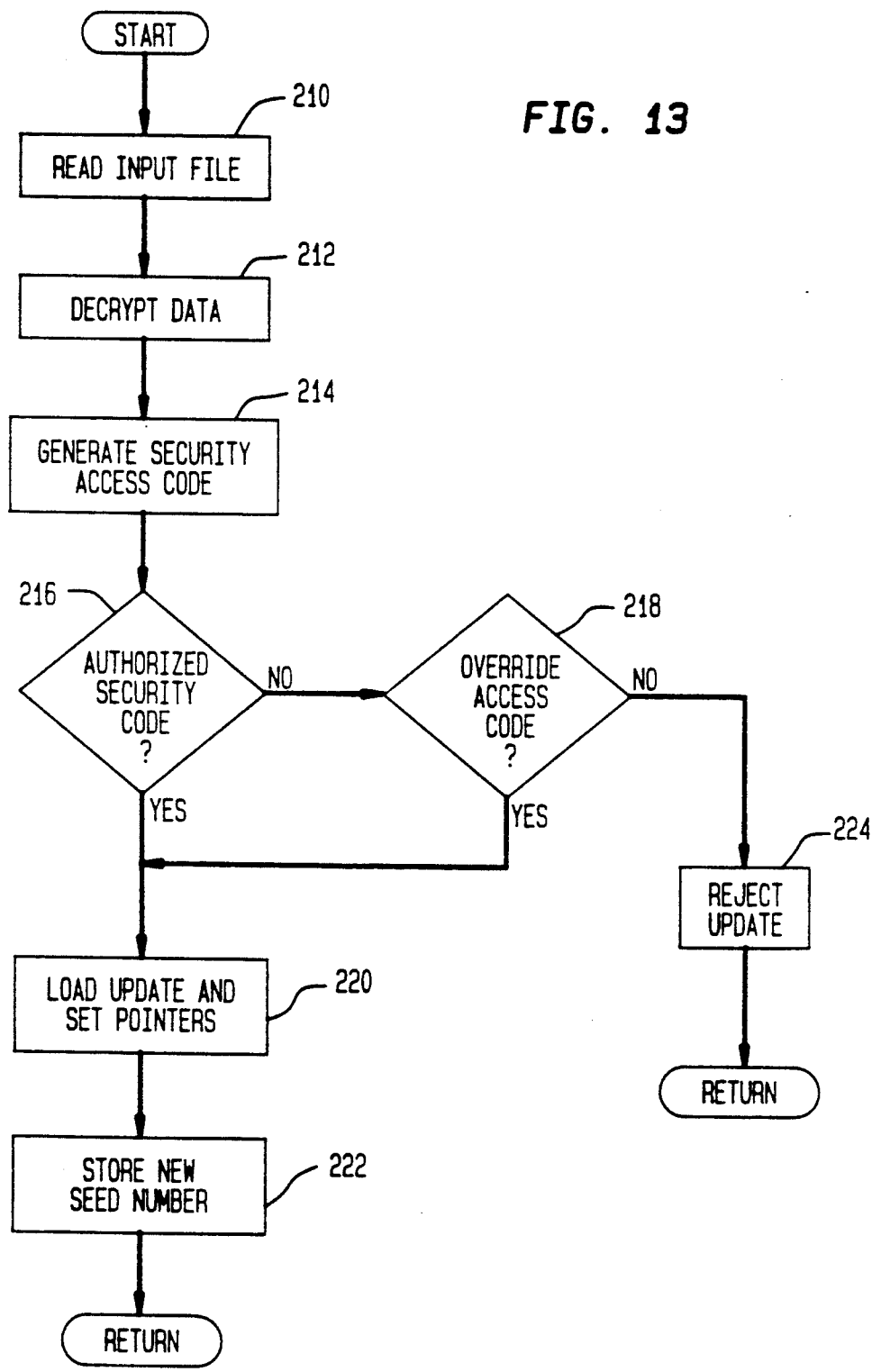
FIG. 13 is a flow chart illustrating the details of the Verify/Validate Update Subroutine used in FIG. 12 system flow.

Assuming that the update is downloaded to the system, in FIG. 13, the system proceeds to read the Customized Discount/Surcharge Configuration Data update input file at step 210. Next, the system will decrypt the data at step 212. (It will be appreciated that some or all of the incoming data may not be encrypted. Although this would decrease the overall level of the system security, the system would still remain very secure.)

The system proceeds by generating a security access code by using a system seed number which was previously installed on the system at step 100.1. The generated security code is then checked at step 216 in order to determine whether it matches the security code from the input file. If the security code is not an authorized security code, the system will check to see if the security code from the input file is an override access code at step 218. If it is not an override access code, the system will return an error message and reject installation of the Discount/Surcharge Update. Assuming the security code from the input file is either an authorized security code or an override access code, the system will then load the update of Customized Discount/Surcharge Configuration Data 42 into the system at step 220. The data may be loaded into any suitable type of memory. While loading this data, pointers will be fixed to locations of the Discount Configuration Data B2 and Surcharge Configuration Data B1. The system will also store the new system seed number for generating the next security access code for future updates at step 222. The system then returns to the main flow and begins to accept as input Mail Piece Processing Data at step 106. (A preferable system for generation of security access codes is described in U.S. Pat. No. 4,447,890, issued to Duwel, et al. May 8, 1984, entitled "Remote Postage Meter Systems Having Variable User Authorization Code, which is hereby incorporated by reference). If Customized Configuration Data Base 42 is updated by physical replacement of a PROM, the system operation is substantially the same way, and once validated, operation with the new PROM is transparent to the system.

Returning to FIG. 12, after being prompted by the system, the user at step 106, will input Mail Piece Processing Data. This input can come in a number of suitable forms. For example, it may come as input from the scale, from a wand/bar code scanner, a keyboard or through a voice recognition system. Next, the system will automatically calculate the applicable base fee rate for the given mail piece at step 108. Generally, computation of base rates (i.e., basic charges for a transaction) and fees for special services is well known and need not be described in detail for an understanding of the subject invention. Briefly, in accordance with a preferred embodiment of the subject invention, Application 32 calls the Rates Subsystem 34 with mail piece and/or shipment inputs to calculate charges. Rates Subsystem 34 determines which standard rate chart in standard Public Rates Data Base 36 to use to calculate the "base rate".

Rates Subsystem 34 then calculates a base rate for the mail piece and/or consolidation shipment using appropriate rating algorithms. The system automatically proceeds to calculate the applicable Special Service Fee Rate for the given mail piece at step 110.

It should be noted that during the time of the changeover period from the prior rating adjustment schemes to that of the present automated application of rating adjustments, some customers will have rates locked in under the contract which would apply discounts against an older standardized base rate from a year prior to that of the currently available base rate. The Rates Subsystem identifies the appropriate chart by using the Old-/New Base Rate Key 61 in Configuration Data 42 obtained from the Discount/Surcharge Subsystem 38.

The system automatically continues by calculating the applicable Discount/Surcharge Fee Rate for the given mail piece at step 112. It does so, without further user input, by calling the Discount/Surcharge Processing Subroutine which will be described later in greater detail below with reference to FIGS. 14 to 22. Rates Subsystem 34 calls Discount/Surcharge Subsystem 38 to calculate the applicable discounts and surcharges. After executing the Discount/Surcharge Processing Subroutine, Discount/Surcharge Subsystem 38 returns the discounts and surcharges to Rates Subsystem 34 and Rates Subsystem 34 reports the base charge, the discounts and surcharges to the application software 32 for posting of all applicable charges to the manifest file at step 114. The reported charges are also used to update the user statistical report file at step 116.

At step 118, the system will check to determine whether it is time to generate a manifest. Typically, the customer or user wishes to generate a manifest when it is the end of the day or there are no more mail pieces to process. If it is not time to generate a manifest report the system will continue at step 106 by accepting more input of Mail Piece Processing Data.

If it is time for a manifest report to be generated, the system will generate it in a suitable form at step 120. Among those suitable forms, the report could be generated in a printed form either human readable (e.g. human intelligible language) or computer recognizable (e.g. bar code format, voice synthesized format or encrypted format.) It is also conceivable that the report information could be electronically downloaded to a portable computer located in the carrier's truck.

Finally, the system will check, at step 122, to see if it is time to generate a periodic statistical report 22.1 of the customer or user for transmission to the carrier. This statistical report 22.1 will be considered by the carrier in its determination of future discounts or surcharges to be made available to the customer. Assuming generation of a statistical report 22.1 is timely, one will be generated from the system in a suitable format. The format may be the same as any of the formats previously described above with respect to the format of the manifest report. Upon generation of the statistical report 22.1, step 124, or a determination that no statistical report 22.1 is necessary, step 122, the system process will end.

Figure 14:
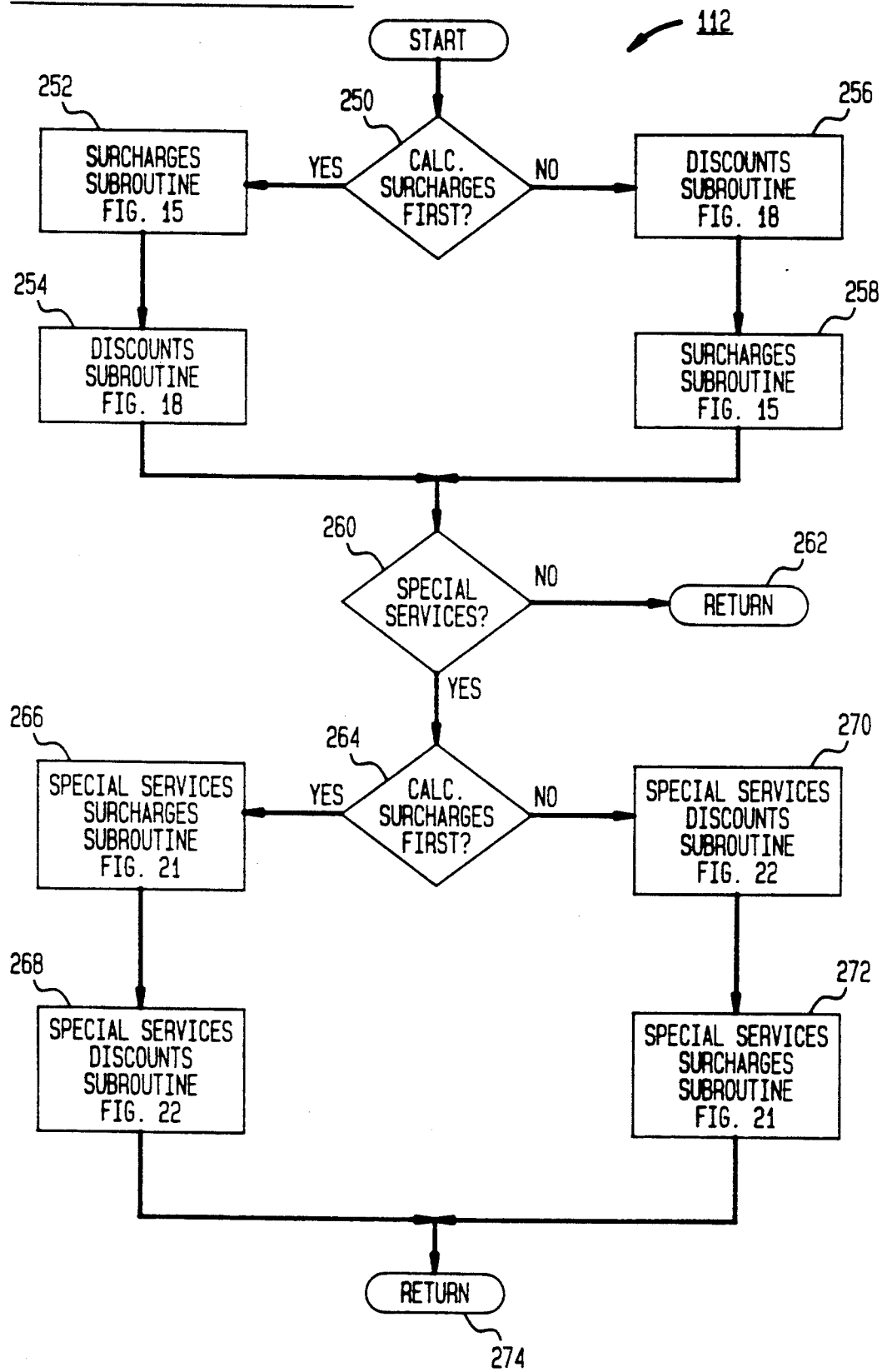
FIG. 14 is a flow chart illustrating the details of the Discount/Surcharges Processing Subroutine 112 used in FIG. 12 system flow.

As previously mentioned, the system at step 112 will call the Discount/Surcharge Processing Subroutine, FIG. 14 in order to calculate the applicable discount-/surcharge for the given mail piece. The details of the flow of this subroutine will be discussed at this point.

Surcharges

At step 250, the system will check Sequence Key 151 to determine whether calculation of surcharges should be handled first before calculations of discounts for the selected carrier. Assuming a surcharge is to be calculated first, the input Mail Piece Processing Data will then be processed at step 252 by entering a Surcharges Subroutine which is shown in greater detail in FIG. 15.

Figure 15:
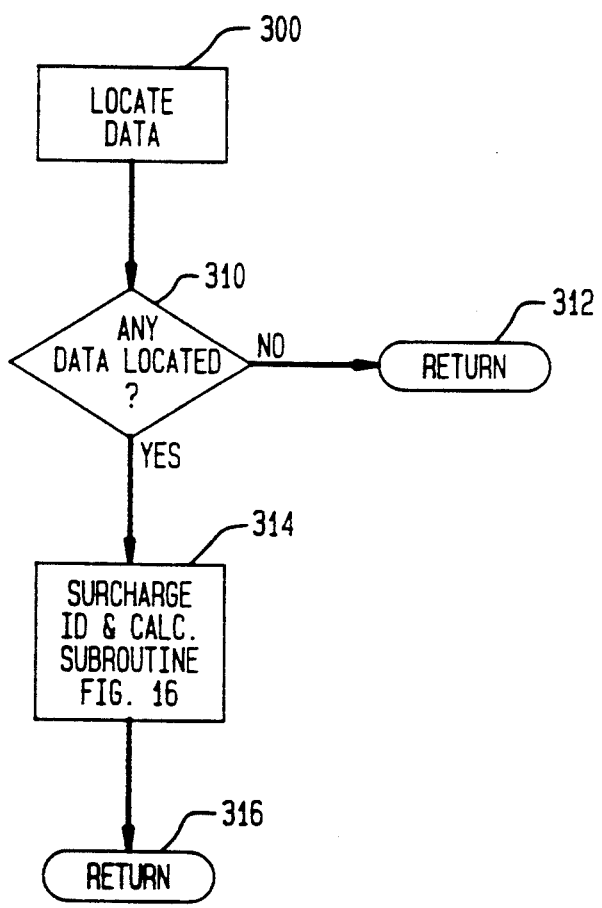
FIG. 15 is a flow chart illustrating the details of the Surcharges Subroutine used in FIG. 14 system flow.

Turning to FIG. 15, the system proceeds to locate data at step 300. In order to locate the service Surcharge Data in Customized Discount/Surcharge Configuration Data 42, the system must follow Pointer to Surcharge Configurations B1 in Master Configuration Pointers 60. The system follows Pointer to Service Surcharge Configuration List 62 and then follows that pointer to the first structure of Service Surcharge Configuration List 64. If pointer 62 is null, the system notes that no Service Surcharge Data exists and will continue processing at the next following step at step 310. In order to determine the correct structure in Service Surcharge Configuration List 64, the system will look for a match between the selected service ID 71 and the service ID 70 of the structures in the Configuration Lists 64. Assuming a match is found, the system will set a working configuration pointer (not shown) to the matched structure in Service Surcharge Configuration List 64.

Next, the system, at step 310, will check whether any data was located in the Surcharge Configuration Data B1 for the selected carrier service. If no data was located, the system, at step 312, will return processing back to the flow of the Discount/Surcharges Processing Routine where the Surcharges Subroutine was called, step 252 in FIG. 14. If data was located at step 310, the system will enter the Surcharge ID and Calculate Subroutine which is shown in greater detail in FIG. 16.

Figure 16:
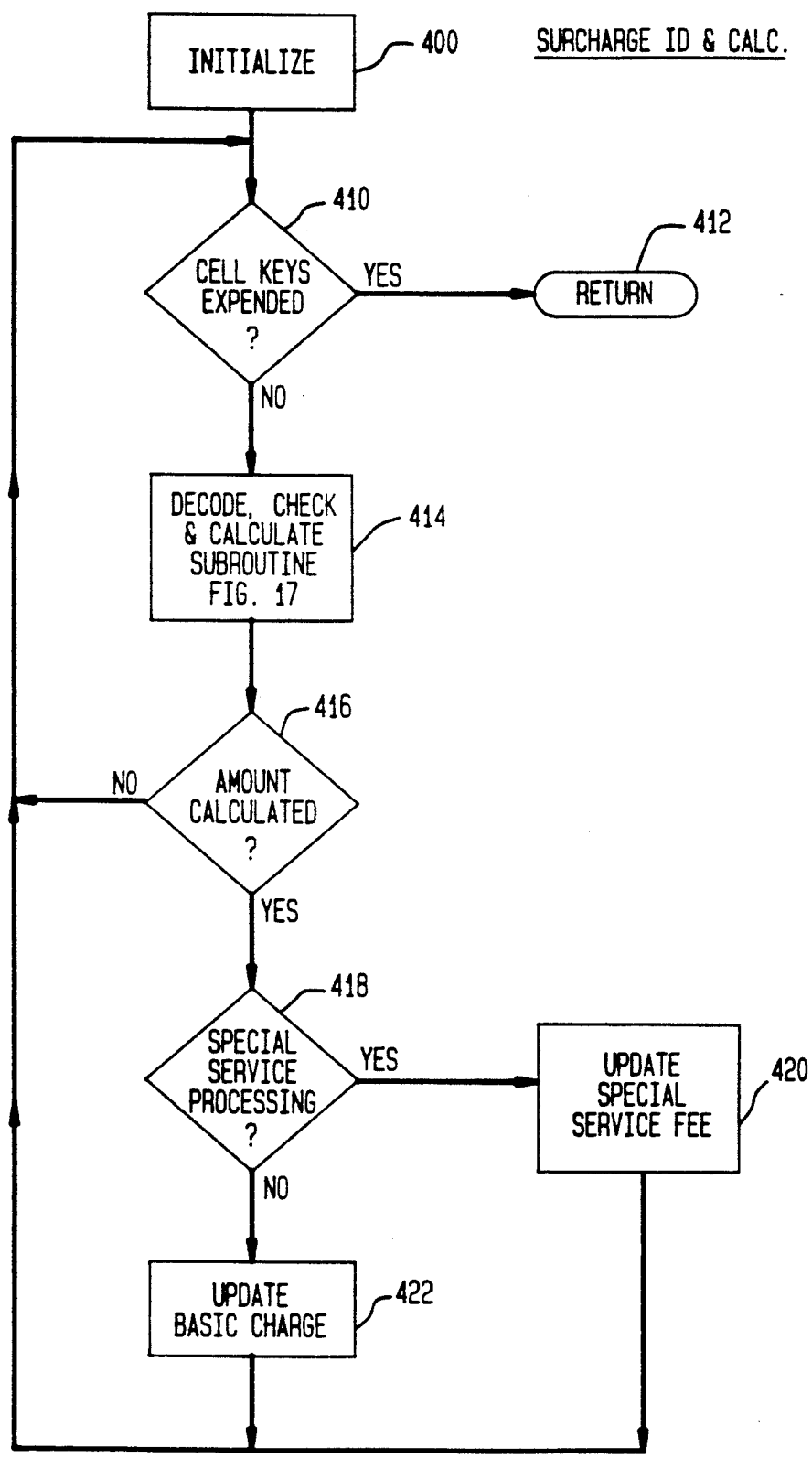
FIG. 16 is a flow chart illustrating the details of the Surcharge ID and Calculate Subroutine used in FIGS. 15 and 21 system flow.

In FIG. 16, the system proceeds, at step 400, by initializing the Cell Key Index and Surcharge Amount variables. The subroutine receives as input the working configuration pointer. After initialization, the system will determine whether all Cell Keys 24.2 in the structure in List 64 identified by the working configuration pointer have been expended (already processed) at step 410. If all such Cell Keys 24.2 have been expended or processed, the system at step 412 will return the flow of processing back to the Surcharges Subroutine where the Surcharge ID and Calculate Subroutine was called, step 314 in FIG. 15. At step 316, the Surcharges Subroutine would return the flow of processing back to the location from where it was called, step 252 in FIG. 14.

Decode, Check & Calculate

Figure 17:
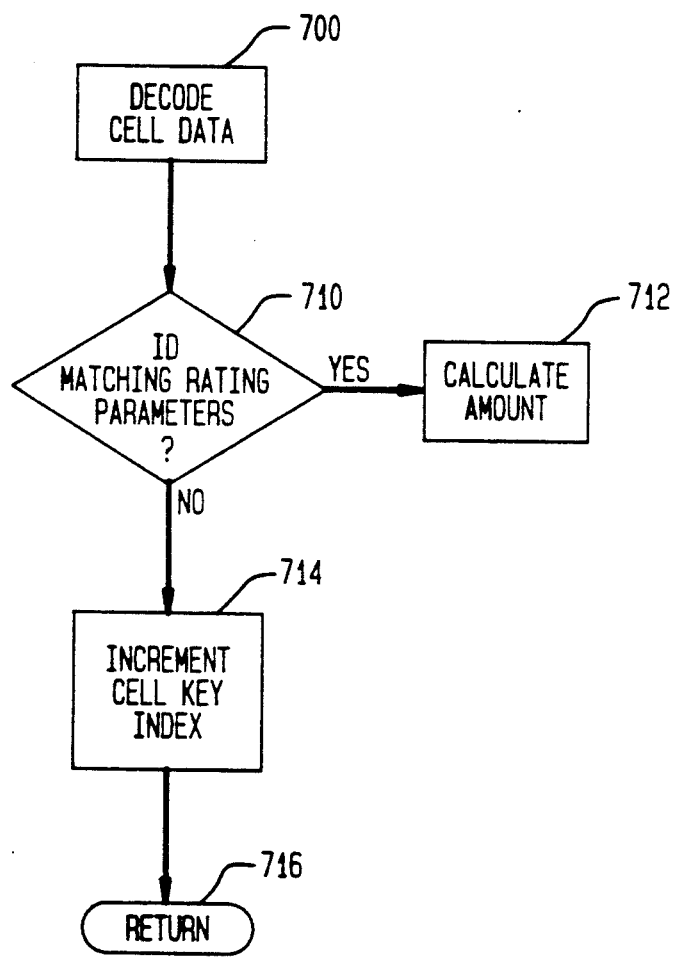
FIG. 17 is a flow chart illustrating the details of the Decode, Check and Calculate Subroutine used in FIGS. 16 and 19 system flow.

Assuming, at step 410, that a determination was made that all Cell Keys 24.2 were not expended, the system will process the Cell Key at step 414 by entering the Decode, Check and Calculate Subroutine which is shown in greater detail in FIG. 17. The system will decode the current Cell Key 24.2, identified by the Cell Key Index which indicates the particular Cell Key of the several within the structure pointed to by the working configuration pointer in the Service Surcharge Configuration List 64 at step 700 in order to get the corresponding criteria. In order to do so, the system will locate the Service Surcharge Cell Key Location Table 160-C3 within the Surcharge Data Base 46 by following Pointer to Surcharges 150, Pointer to Service Surcharges 152-A2 (Note for FIGS. 11A–11B, like elements will be referenced using the same reference numeral distinguished by the corresponding suffix) and Service Surcharge Pointer to Cell Key Location Table 156-C3 and determine the correct entry in the Cell Key Location Table 160-C3 by matching the Selected Service ID 71 with the Service ID 70-C3. The system will locate the Cell Key Table 24.1 by using the Pointer to Cell Key Table 162-C3 field in entry of Cell Key Location Table 160-C3. The format of the Cell Key Table 24.1 will be based upon the Table Type 164-C3 field in the entry in the Cell Key Location Table 160-C3. The Cell Key Table 24.1 will be accessed by using the current Cell Key 24.2 (identified by the Cell Key Index) from the selected Customer Service Configuration List 64 (identified by the working configuration pointer) and the data (specifying criteria for applying the surcharge) will be put into the appropriate variables as determined from the Table Type 164-C3 for the selected service as defined in Cell Key Location Table 160-C3. Preferably, access in the Cell Key Table will be done by using the current Cell Key 24.2 as a direct index. That is, for example, a Cell Key 24.2 equal to 10 would correspond to the 10th element in the Cell Key Table 24.1-C3.

At step 710, a comparison of parameters for the mail piece or shipment with criteria for the current Cell Key 24.2 will be made. The system will use the Table Type 164-C3 from Cell Key Location Table 160-C3 entry to determine the pairings between the parameters and criteria. If all the comparison results are found to be true, then a match will be identified between the rating parameters and criteria.

If there is a match of the parameters with the criteria, the system will calculate an amount as specified in the corresponding Value Key 26.2, step 712. The system will get the Value Key 26.2 from the Cell Key/Value Key 24.2/26.2 pair in the current entry in Configuration List 64. Next, the Value Key Table 26.1 for the selected carrier and service will be located by following within Surcharge Data Base 46 Pointer to Surcharges 150, Pointer to Service Surcharges 152-A2 and Pointer to Value Key Location Table 158-C3. As described above, the system will then identify the correct entry in Value Key Location Table 170-C3 by matching the Selected Service ID 71 and follow the Pointer to Value Key Table 172-C3 to the Value Key Table 26.1 for the selected service. Current Value Key 26.2 will be used as a direct index into the Value Key Table 26.1. The system, by using the Table Type 164-C3 of the Cell Key Table 24.1, will also determine what charges constitute the Basic Charge against which the Value Amount will be applied. In order to determine which method of calculation is to be used, e.g. percentage or flat rate, the Transition Index 174-C3, which identifies the entry in Value Key Table 26.1-C3 at which the method of calculation changes, for the Value Key Table 26.1-C3 will be used.

If the method of calculation is that of a flat rate, the amount is the flat dollar amount from the Value Key Table 26.1-C3 entry. If the method of calculation is a percentage rate and processing is for a service, the amount is the lesser of the Basic Charge times the percentage or the ceiling value amount. If processing a special service and the method of calculation is a percentage rate, then the amount is the lesser of the special service fee times the percentage rate or of the ceiling value amount.

After calculating the amount at step 712, the system will increment Cell Key Index at step 714 in order to access the next Cell Key 24.2 within the current entry of the selected Customer Service Configuration List 64. The Decode, Check and Calculate Subroutine would return at step 716 the flow of processing back to the Surcharge ID and Calculate Subroutine at step 414 in FIG. 16. The system will proceed to step 416 and determine whether a Surcharge Amount had been calculated. If no amount was calculated, the system will loop back to step 410 and go through the Cell Keys 24.2 until an amount is calculated.

Assuming an amount was calculated, the system will check at step 418 to see whether special services are being processed. If so, then the system will update the Special Service Fee at step 420 by adding the Surcharge Amount to the Special Service Fee and storing that amount. If there is no processing of a special service, the system at step 422 will update the Basic Charge by adding the Surcharge Amount to the Basic Charge and storing that amount. The decision concerning processing of special services, step 418, is being described at this juncture because it completes the Surcharge ID and Calculate Subroutine. This subroutine is called to handle surcharge calculations for both services and special services. The additional processes for handling of calculation of surcharges for special services will be described in greater detail below with respect to the Special Services Surcharges Subroutine FIG. 21. After either step 420 or 422 has been completed, the system will loop back to step 410 and continue processing until each and every applicable surcharge has been calculated and added to the proper fee or charge. Eventually, at step 412, the Surcharge ID and Calculate Subroutine will return the flow of processing back to the Surcharges Subroutine at step 314 which will then return the flow, at step 316, back to where it was originally called at step 252.

Discounts

Figure 18:
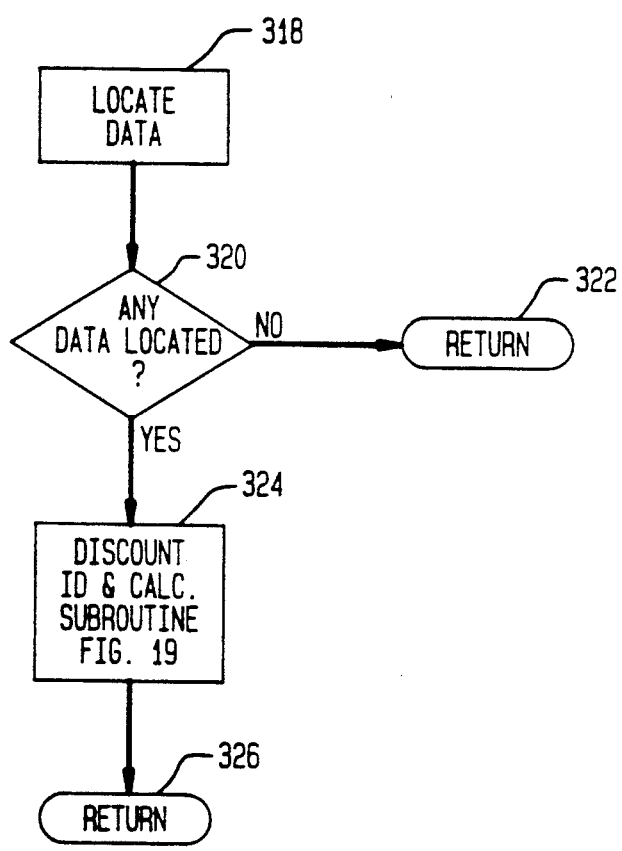
FIG. 18 is a flow chart illustrating the details of the Discounts Subroutine used in FIG. 14 system flow.

After all surcharges have been calculated, the system will seek to determine all applicable discounts by entering into the Discounts Subroutine at step 254 which is shown in greater detail in FIG. 18.

In FIG. 18, the system proceeds to locate data at step 318. In order to locate the service Discount Data in the Customized Discount/Surcharge Configuration Data 42, the system must follow the Pointer to Discount Configurations B2 in the Master Configuration Pointers 60. The system follows the Pointer to Service Discount Configuration List 80 and then follows that pointer to the first structure of Service Discount Configuration List 82. If pointer B2 or Pointer to Service Discount Configuration List is null, the system notes that no Service Discount Data exists and will continue processing at the next following step, step 320. In order to determine which is the correct structure in Discount Configuration List 82, the system will look for a match between the selected service 71 and the Service ID 70 of the structures in Service Discount Configuration List 82. Assuming a match is found, the system will set the working configuration pointer (not shown) to the matched structure in Customer Discount Configuration List 82.

Next, the system, at step 320, will check whether any data was located in the Discount Configuration Data B2 for the selected carrier service. If no data was located, i.e. no match found at step 318, at step 322, the system will return processing back to the flow of the Discount/Surcharges Processing Routine where the Discount Subroutine was called, at step 254 in FIG. 14. If data was located, at step 320, the system will enter the Discount ID and Calculation Subroutine which is shown in greater detail in FIG. 19.

Figure 19:
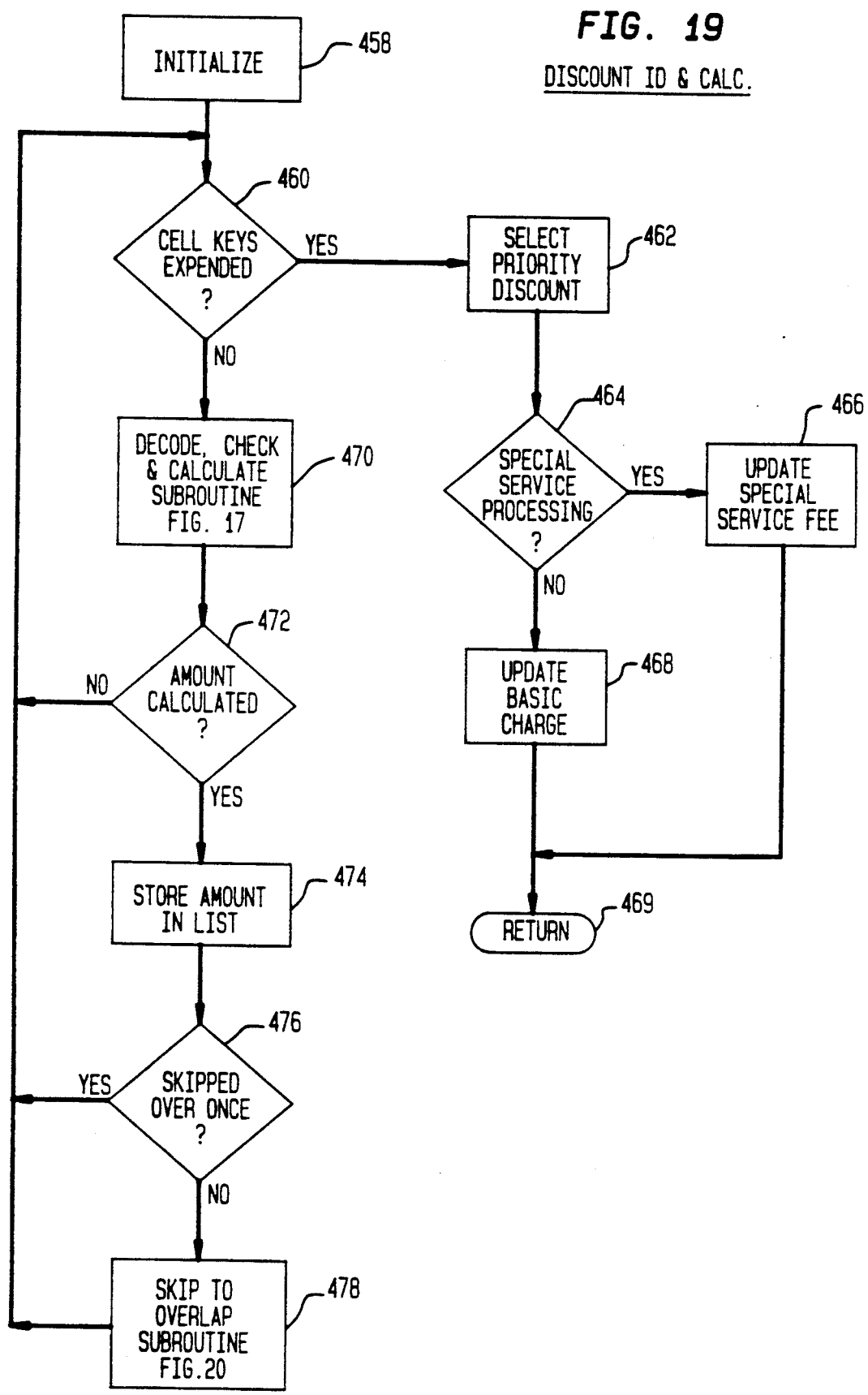
FIG. 19 is a flow chart illustrating the details of the Discount ID and Calculate Subroutine used in FIGS. 18 and 21 system flow.

In FIG. 19, the system proceeds at step 458 by initializing the Cell Key Index and Discount Amount variables. The subroutine receives as input the working configuration pointer. After initialization, the system will determine whether all Cell Keys 24.2 in the structure pointed to by the working configuration pointer have been expended at step 460. If all Cell Keys 24.2 have been expended, the system at step 462 will select the priority discount in accordance with the Resolve Discounts Key 59, which would direct the system to an appropriate routine to resolve the multiple discounts in accordance with carrier specifications, and store that amount as the Discount Amount. For example, carrier 12 may specify that only the smallest, largest, or the average discount amount should be applied when multiple discounts are encountered.

Assuming the Discount Amount has been determined, the system will check at step 464 to see whether special services are being processed. If so, then the system will update the Special Service Fee at step 466 by deducting the Discount Amount from the Special Service Fee and storing that amount. If processing is of a service other than a special service, the system at step 468 will update the Basic Charge by deducting the Discount Amount from the Basic Charge and storing that amount. The contents of the Basic Charge are determined from the Cell Key Table Type 164. The decision concerning processing of special services, step 464, is being described at this juncture because it completes the Discount ID and Calculate Subroutine. This subroutine is called to handle discount calculations for both services and special services. The additional processes for handling of calculation of discounts for special services will be described in greater detail below with respect to the Special Services Discounts Subroutine FIG. 22. After either step 466 or 468 has been completed, the system will, at step 469 of the Discount ID and Calculate Subroutine will return the flow of processing back to the Discounts Subroutine at step 324 in FIG. 18 which will then return the flow, at step 326, back to where it was originally called at step 254 in FIG. 14. Processing will continue at step 260, which will be described further below.

Assuming at step 460, that a determination was made that all Cell Keys 24.2 were not expended, the system will process the Cell Key 24.2 at step 470 by entering the Decode, Check and Calculate Subroutine FIG. 17, which was previously discussed in greater detail with respect to surcharges. Instead of referencing the pointers, configuration structures and tables which correspond to surcharges, the system will now reference those which pertain to discounts. Eventually, the Decode, Check and Calculate Subroutine would return at step 716 the flow of processing back to the Discount ID and Calculate Subroutine at step 470. The system will proceed to step 472 and determine whether a Discount Amount had been calculated. If no amount was calculated, the system will loop back to step 460 and go through the Cell Keys 24.2 until an amount is calculated.

Assuming an amount was calculated, the system will store the amount in a list at step 474. (It will be noted that discounts are listed, while surcharges are applied cumulatively. While either discounts or surcharges may be handled in either manner, the present embodiment is preferred since carriers typically will want to collect all surcharges, but will not necessarily want to give multiple discounts).

Next, at step 476, the system will determine whether execution of the Skip to Overlap Subroutine has occurred. The Overlap Cell Key Subroutine increases the speed of the system by allowing the system to ignore Cell Keys 24.2 which are known to be excluded, once a first Cell Key 24.2 is matched. For example, in FIG. 3, once a particular Cell Key 24.2 which is based on a single zone is matched, then all other Cell Keys based on a single zone are excluded, and may be skipped. For all of the Cell Keys 24.2 which are skipped, the system will save time and increase speed because the system will not have to decode each of the skipped Cell Keys 24.2 in order to match the specific criteria decoded from the skipped Cell Key with the parameters for the given transaction. Only the Cell Keys relating to criteria for "ALL" zones will have potential for overlap with the matched zone and need to be considered. Preferably to achieve this, Cell Keys 24.2 which are mutually exclusive are assigned Cell Key Values having a relatively high value, and other Cell Keys 24.2 which overlap these mutually exclusive Cell Keys 24.2 are assigned a relatively low Cell Key value, and the Cell Keys 24.2 are entered into the Configuration List 82 (84) in descending order. Once the Cell Keys 24.2 are so ordered, an Overlap Index 174 may be identified for these mutually exclusive Cells, and once the criteria for such mutually exclusive Cell Keys have been met, the system may immediately skip ahead checking for additional discounts, to the Cell Keys which have a value less than that of the Overlap Index 174, thus increasing system speed.

Since the subject invention contemplates an essentially infinite number of Cells (definition of rating adjustment criteria) which may be defined for applying discounts or surcharges, ordering of the Cell Keys 24.2 and assignment of the Overlap Index 174 can only be done in general by inspection and experimentation, which would be easily within the skill of a person of ordinary skill of the art. It shall also be understood to those skilled in the art that the Skip to Overlap Subroutine may also be incorporated for use in the Surcharge ID and Calculation Subroutine FIG. 16.

Figure 20:
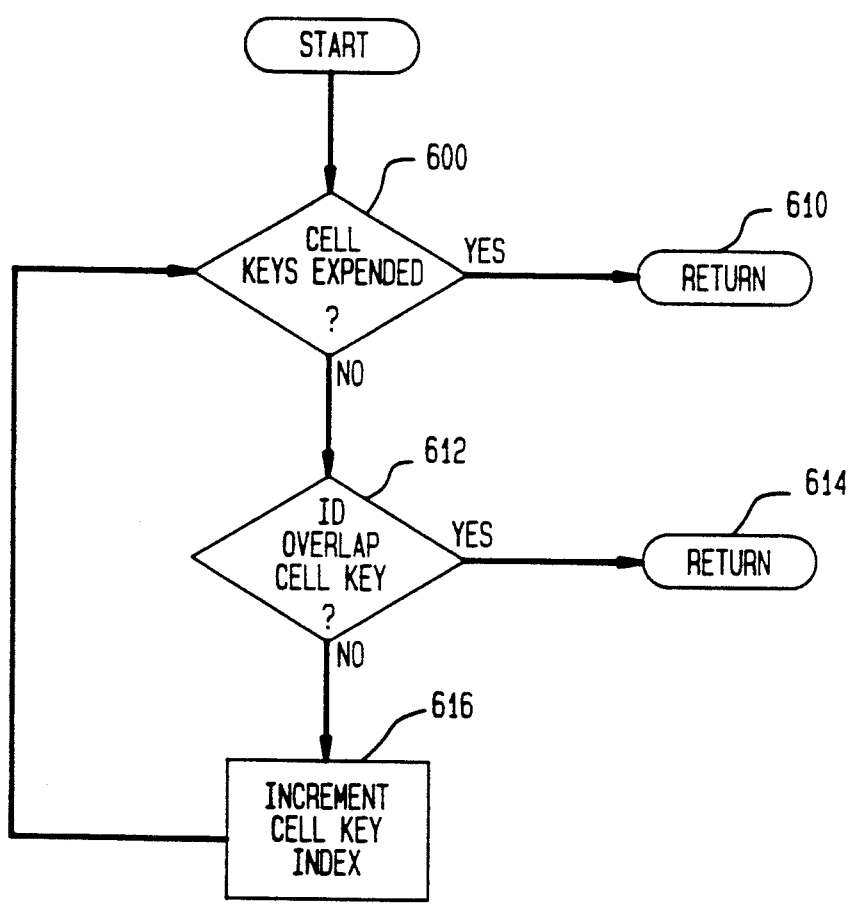
FIG. 20 is a flow chart illustrating the details of the Skip to Overlap Subroutine used in FIG. 19 system flow.

If the Skip to Overlap Subroutine FIG. 20 has already been executed once, the system will loop back to step 460 and go through the overlap Cell Keys 24.2 sequentially processing through as it would have processed any previous Cell Key. Eventually, all overlap Cell Keys 24.2 will be expended (i.e. it is preferred that there be at most, one skip in a Cell Key Table 24.1). The system processing would continue to step 462, and thereafter, processing continues as was previously described with respect to step 462 and the steps thereafter. Assuming that no execution of the Skip to Overlap Subroutine FIG. 20 had already occurred, the system at step 478 will enter into the Skip to Overlap Subroutine which is shown in greater detail in FIG. 20. In FIG. 20, the system will determine at step 600 whether all Cell Keys 24.2 have been expended. If so, at step 610, the system will return the flow of processing back to where the Skip to Overlap Subroutine was called, step 478 in FIG. 19. At which point, the system will loop back to step 460. Since all the Cell Keys 24.2 were expended, processing would continue at step 462, and thereafter, processing continues as was previously described with respect to step 462 and the steps thereafter.

Assuming that all Cell Keys 24.2 were not expended, the system will check at step 612, whether the current Cell Key from the selected one of List 82 is an overlap Cell Key. A Cell Key 24.2 is an overlap Cell Key if the Cell Key is less than the Overlap Index 166 as defined by the particular Cell Key Table. If it is an overlap Cell Key, at step 614, the system will return the flow of processing back to where the Skip to Overlap Subroutine was called, step 478. At which point, the system will loop back to step 460 and go through the overlap Cell Keys 24.2 sequentially processing through as it would have processed any previous Cell Key 24.2. Eventually, processing would reach step 254 and processing would continue at step 260, which will be described further below. If the current Cell Key is not an overlap Cell Key, the system will increment Cell Key Index to the next Cell Key 22.4 in the current structure in the Configuration List 82, at step 616, and loop back for further processing at step 600. Eventually, either all Cell Keys 24.2 will be expended, step 600, or an overlap Cell Key 24.2 will be identified, step 612, and the Skip to Overlap Subroutine will return, respectively, at step 610 or 614 the flow of processing back to where the Skip to Overlap Subroutine was called, step 478. At which point, the system will loop back to step 460.

If all Cell Keys 24.2 had been expended, processing would continue at step 462, and thereafter, processing continues as was previously described with respect to step 462 and the steps thereafter.

If an overlap Cell Key 24.2 was identified, the system will loop back to step 460 and go through the Cell Keys which overlap, sequentially processing through as it would have processed any previous Cell Key 24.2. Eventually, all overlap Cell Keys 24.2 will be expended. The system processing would continue to step 462, and thereafter, processing continues as was previously described with respect to step 462 and the steps thereafter.

Referring back to step 250 of FIG. 14 and assuming that a discount, rather than a surcharge, is to be calculated first, the input Mail Piece Processing Data will then be processed at step 256 by entering the Discounts Subroutine FIG. 18. The Discounts Subroutine is the same as the Discounts Subroutine which was previously described at step 54, however, whenever the return of the flow of processing returns to the Discount/Surcharge Processing Subroutine it would be to step 256, rather than to step 254.

After calculating the applicable discounts at step 256, the system would proceed to step 258 and enter the Surcharges Subroutine FIG. 15. The Surcharges Subroutine is the same as the Surcharges Subroutine which was previously described at step 252, however, whenever the return of the flow of processing returns to the Discount/Surcharge Processing Subroutine 112 it would be to step 258, rather than to step 252.

Assuming that either Discount Subroutine at step 254 or Surcharge Subroutine at step 258 have been executed, the system will continue processing at step 260 by checking to see if user 10 has selected for processing any special services for the given transaction. If no special services were selected, the system will return the flow of processing to Discount/Surcharge Processing Subroutine 112, and thereafter, processing continues as was previously described with respect to step 112 and the steps thereafter.

Special Services Surcharges

Assuming it was determined at step 260 that special services were selected for processing, the system would continue processing at step 264. At step 264, the system will check Sequence Key 151 to determine whether calculation of surcharges should be handled first before calculations of discounts for the selected carrier special service. Assuming a surcharge is to be calculated first, the input Mail Piece Processing Data will then be processed at step 266 by entering a Special Services Surcharges Subroutine which is shown in greater detail in FIG. 21.

Figure 21:
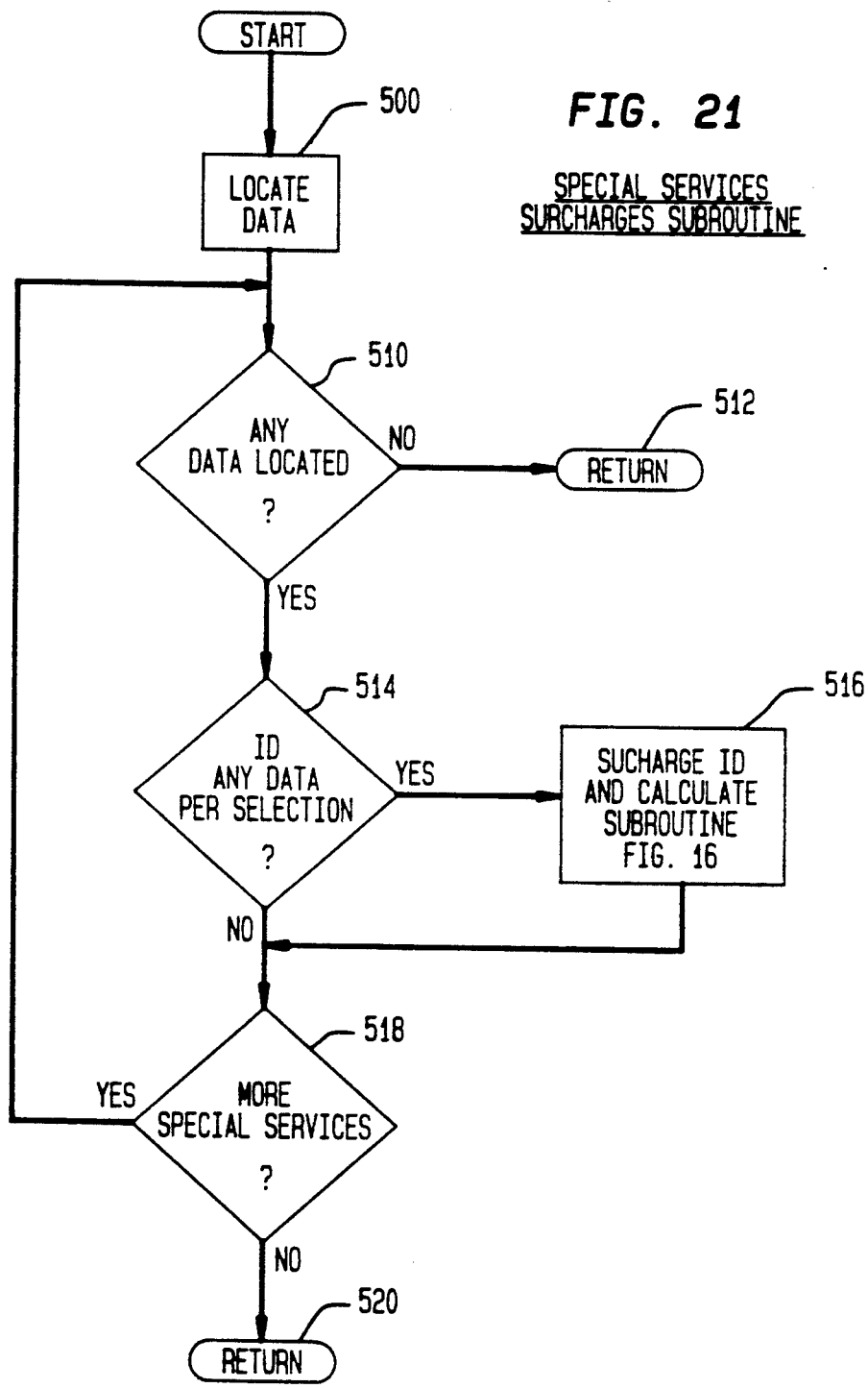
FIG. 21 is a flow chart illustrating the details of the Special Services Surcharges Subroutine used in FIG. 14 system flow.

Turning to FIG. 21, the system proceeds to locate data at step 500. In order to locate the Special Service Surcharge Data in the Customized Discount/Surcharge Configuration Data 42, the system must follow the Pointer to Surcharge Configurations B1 in the Master Configuration Pointers 60. The system follows the Pointer to Special Service Surcharge Configuration List 63 to the first structure of Special Service Surcharge Configuration List 66. If the pointer 63 is null, the system notes that no Special Service Surcharge Data exists and will continue processing at the next following step at step 510. In order to determine which is the correct Special Service Surcharge Configuration structure in the list 66, the system will look for a match between the selected special service ID 71.1 (not shown) and the special service ID 70.1 of the structures in the Configuration List 66. Assuming a match is found, the system will set a working configuration pointer (not shown) to the matched structure in Special Service Surcharge Configuration List 66.

Next, the system, at step 510, will check whether any data was located in the Special Service Surcharge Configuration Data B1 for any carrier special service. If no data was located, the system at step 512, will return processing back to the flow of the Discount/Surcharges Processing Routine where the Special Services Surcharges Subroutine was called, step 266 in FIG. 14. If data was located, at step 510 the system will check whether any data was identified in the Special Service Surcharge Configuration Data B1 for the selected carrier special service. If data for the selected carrier special service was identified, then the system will enter the Surcharge ID and Calculate Subroutine which is shown in greater detail in FIG. 16.

The Surcharge ID and Calculate Subroutine FIG. 16, will handle the processing of data in the same manner as was previously described at step 314. However, the system at step 412 will return the flow of processing back to the Special Services Surcharges Subroutine where the Surcharge ID and Calculate Subroutine was called, step 516. Assuming no data for the selected carrier special service was identified at step 514, the system would then check, at step 518, to determine whether any more special services had been selected for the current transaction. If more special services were selected, the system would loop back the flow of processing to step 500 and continue processing in the same manner as previously discussed at step 500 and the steps thereafter. Eventually, there will be no more selected special services found for processing at step 518 and the system, at step 520 would return the flow of processing back to the location from where it was called, step 266.

Special Services Discounts

Figure 22:
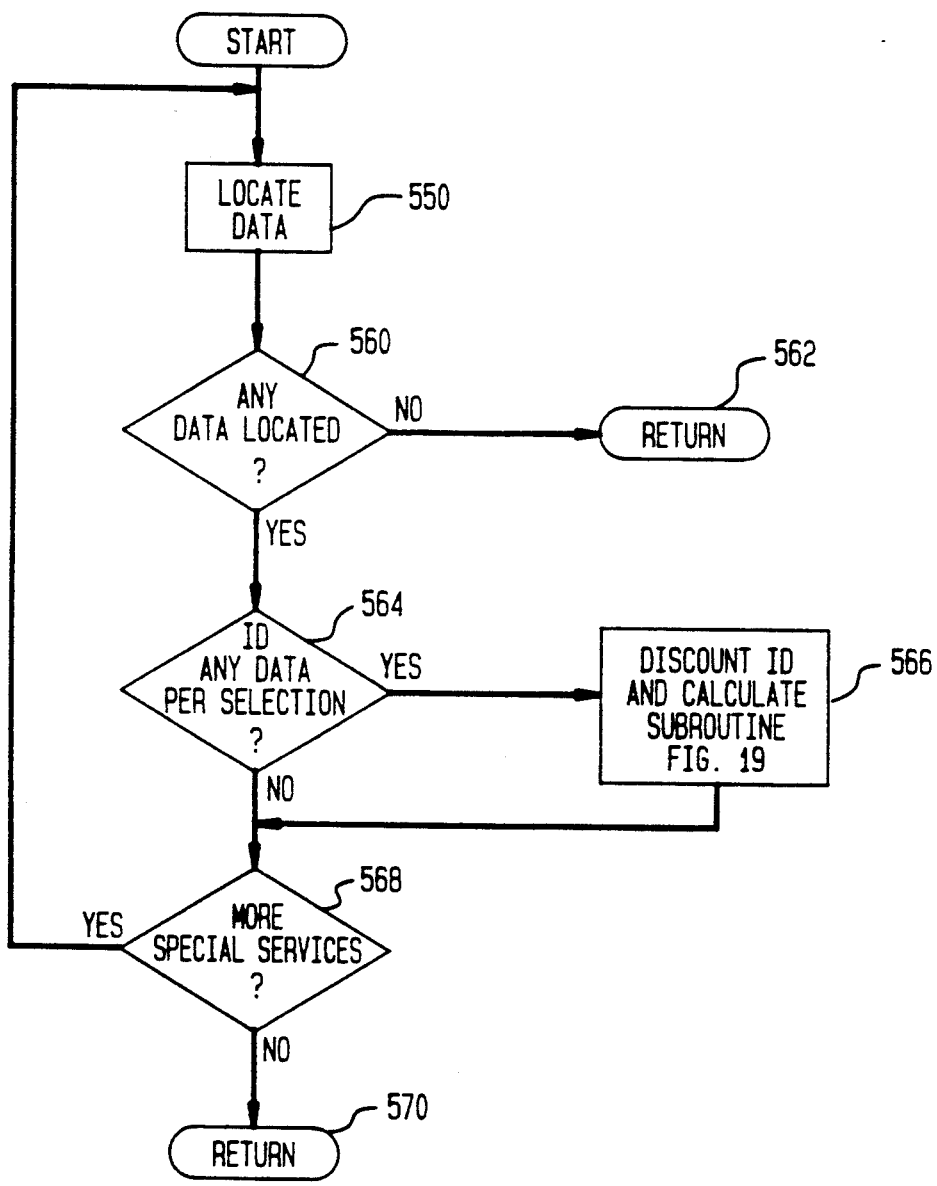
FIG. 22 is a flow chart illustrating the details of the Special Services Discounts Subroutine used in FIG. 14 system flow.

After all special service surcharges have been calculated, the system will seek to determine all applicable special service discounts by entering into the Special Services Discounts Subroutine at step 268 which is shown in greater detail in FIG. 22.

In FIG. 22, the system proceeds to locate data at step 550. In order to locate the Special Service Discount Data in the Customized Discount/Surcharge Configuration Data 42, the system must follow the Pointer to Discount Configurations B2 in the Master Configuration Pointers 60. The system follows Pointer to Special Service Discount Configuration List 81 and then follows that pointer to the first of the structures in Special Service Discount Configuration List 84. If pointer B2 or pointer 81 is null, the system notes that no Special Service Discount Data exists and will continue processing at the next following step, at step 560. In order to determine which is the correct structure in Special Service Discount Configuration List 84, the system will look for a match between the selected special service 71.1 and the Special Service ID 70.1 of the structures in the Configuration List 84. Assuming a match is found, the system will set the working configuration pointer (not shown) to the matched structure in Special Service Discount Configuration List 84.

Next, the system, at step 560, will check whether any data was located in the Special Service Discount Configuration Data B2 for any carrier special service. If no data was located, the system, at step 562, will return processing back to the flow of the Discount/Surcharges Processing Routine where the Special Services Discount Subroutine was called, at step 268 in FIG. 14. If data was located at step 560, the system will check whether any data was identified in the Special Service Discount Configuration Data List 82 for the *selected* carrier special service. If data for the selected carrier special service was identified, then the system will enter the Discount ID and Calculate Subroutine which is shown in greater detail in FIG. 19.

The Discount ID and Calculate Subroutine FIG. 19 will handle the processing of data in the same manner as was previously described at step 324. However, the system at step 469, will return the flow of processing back to the Special Services Discount Subroutine where the Discount ID and Calculate Subroutine was called, step 566. Assuming no data for the selected carrier special service was identified at step 564, the system would then check, at step 568, to determine whether any more special services had been selected for the current transaction. If more special services were selected, the system would loop back the flow of processing to step 550 and continue processing in the same manner as previously discussed at step 550 and the steps thereafter. Eventually, there will be no more selected special services found for processing at step 568 and the system, at step 570 would return the flow of processing back to the location from where it was called, step 268.

Referring back to step 264 of FIG. 14 and assuming that a Special Services Discount, rather than a Special Services Surcharge, is to be calculated first, the input Mail Piece Processing Data will then be processed at step 270 by entering the Special Services Discounts Subroutine FIG. 22. The Special Services Discounts Subroutine is the same as the Special Services Discounts Subroutine which was previously described at step 268, however, whenever the return of the flow of processing returns to the Discount/Surcharge Processing Subroutine it would be to step 270, rather than to step 268.

After calculating the applicable discounts for special services at step 270, the system would proceed to step 272 and enter the Special Services Surcharges Subroutine FIG. 21. The Special Services Surcharges Subroutine is the same as the Special Services Surcharges Subroutine which was previously described at step 266, however, whenever the return of the flow of processing returns to the Discount/Surcharge Processing Subroutine it would be to step 272, rather than to step 266.

The above description has been provided by way of illustration only, and those skilled in the art will be aware of numerous other embodiments of the subject invention from the detailed description set forth above and the attached drawings. Particularly, though the preferred embodiment described above provides for a single carrier, it will be readily apparent that multiple carriers can be handled by provision of multiple data bases. It is contemplated that this system could also be used for handling a non-customized rating adjustment to the base rate. Moreover, it is contemplated that a single data base could be used for information pertaining to all carriers. Further, though the preferred embodiment described above used the same parameters to determine base rates and discounts and surcharges, it is within the contemplation of the subject invention that determination of discounts or surcharges may require input of additional parameter values. Additionally, although the invention has been described in the context of a parcel manifest system, the invention may also be used advantageously employed in a variety of other systems which provide charges for a definable event (transaction) across a varying population (varying accounts) wherein the charges calculated may be associated with definable portions of the population (accounts). Such systems for calculating charges may be systems that calculate charges for phone calls, for insurance premiums, for mortgage rates or application of benefits (e.g. healthcare, welfare). Thus, the invention is not to be considered to be limited by the embodiments disclosed herein, the invention is intended instead to be limited only as defined by the appended claims.

What is claimed is:

1. A method for determining charges for a class of transactions, comprising the steps of:

a) partitioning said class into cells in accordance with predetermined criteria;
b) providing a user with apparatus for computing base rates for said transactions, said apparatus being responsive to configuration data stored in said apparatus to select particular discounts or surcharges from a plurality of predetermined discounts or surcharges, and to apply said particular discounts or surcharges to said base rates for said transactions to determine said charges, said configuration data defining correspondences between said discounts or surcharges and said cells, and said configuration data having a predetermined form and being communicated to said apparatus through a selected medium;
c) defining custom discount rates for said user;
d) transmitting data defining said custom discount rates to a data processing center;
e) at said data processing center, inputting said defining data to means for translating said defining data into corresponding configuration data in said form, and
f) transmitting said corresponding configuration data to said apparatus through said medium to update said stored configuration data and implement said custom discount rates.

2. A method as described in claim 1 wherein said apparatus includes a memory for storing a data base, said data base including a table of said criteria for defining said cells and a table of values for said discounts or surcharges, and said configuration data includes a list of pairs of cell keys and value keys, each of said cell keys corresponding to an element of said criteria table, and each of said value keys corresponding to an element of said values table.

3. A method as described in claim 2, said method being further for determining charges for a plurality of classes of transactions, wherein said data base further includes a plurality of criteria tables, each corresponding to one of said classes, and a plurality of values tables, each corresponding to one of said classes.

4. A method as described in claim 3, wherein said configuration data includes a plurality of lists of pairs of cell keys and values keys, each corresponding to one of said classes, each of said lists being a structure in a linked list.

5. A method as described in claims 1, 2, 3 or 4 wherein said apparatus is further for providing statistical reports about said user's transactions to a supplier from which said user purchases goods or services, whereby said supplier may consider said statistical reports in selecting said criteria, or in negotiating said custom discount rates with said user.

6. A method as described in claim 5 wherein said transactions comprise shipment of parcels.

7. A method as described in claims 1, 2, 3 or 4, wherein said defining data includes an authorization code, said data processing center rejecting said defining data unless said authorization code is verified.

8. A method as described in claim 7 wherein said transactions comprise shipment of parcels.

9. A method as described in claims 1, 2 3 or 4, wherein said corresponding configuration data includes a security access code unique to said apparatus and a sequence of updates of said configuration data for said apparatus.

10. A method as described in claim 9 wherein said transactions comprise shipment of parcels.

11. A method as described in claims 1, 2, 3 or 4 wherein said medium is electronic transmission to said apparatus.

12. A method as described in claim 11 wherein said transactions comprise shipment of parcels.

13. A method as described in claims 1, 2, 3 or 4 wherein said medium is shipment of a memory unit.

14. A method as described in claim 13 wherein said memory unit is a replaceable PROM.

15. A method as described in claim 14 wherein said transactions comprise shipment of parcels.

16. A method as describe in claims 1, 2, 3 or 4 wherein said transactions comprise shipment of parcels.

* * * * *